United States Patent [19]
Koyama et al.

[11] Patent Number: 5,982,056
[45] Date of Patent: Nov. 9, 1999

[54] THERMOSETTING RESIN COMPOSITION, ELECTRICALLY INSULATED COIL, ELECTRIC ROTATING MACHINE AND METHOD FOR PRODUCING SAME

[75] Inventors: Tohru Koyama; Katsuo Sugawara, both of Hitachi; Shoichi Maruyama, Yamatsuri; Ikushi Kano, Tokai; Yoshikiyo Kashiwamura, Hitachi, all of Japan

[73] Assignee: Hitachi, Ltd., Tokyo, Japan

[21] Appl. No.: 08/866,147

[22] Filed: May 30, 1997

[30] Foreign Application Priority Data

May 30, 1996 [JP] Japan .................................. 8-136157

[51] Int. Cl.⁶ .................................................. H02K 3/30
[52] U.S. Cl. ............................................. 310/43; 310/42
[58] Field of Search ................................. 310/42, 43, 45, 310/214, 215

*Primary Examiner*—Nestor Ramirez
*Assistant Examiner*—Karl I E Tamai
*Attorney, Agent, or Firm*—Antonelli, Terry, Stout & Kraus, LLP

[57] ABSTRACT

A highly thermal-conductive and thermal-resistant electrically insulated coil with less outflow of a thermosetting resin composition can be produced, to provide a small-scale, light-weight rotating machine with high power. The thermosetting resin composition comprises (a) a polyfunctional epoxy resin containing three or more p-(2,3-epoxypropoxy) phenyl groups and a group represented by the Chemical formula 1; or an epoxy resin with a naphthalene backbone, represented by the Chemical formula 3, 4 or 5 or an epoxy resin with an anthracene backbone, such as diglycidyl ether of anthracene diol and triglycidyl ether of anthracene triol; (b) a bifunctional epoxy resin containing two p-(2,3-epoxypropoxy) phenyl groups; (c) an acid anhydride curing agent; and (d) a metal acetonate curing catalyst represented by the Chemical formula 2 at 0.1 to 5 parts by weight per 100 parts by weight of the epoxy resins.

16 Claims, 4 Drawing Sheets

THERMOSETTING RESIN COMPOSITION, ELECTRICALLY INSULATED COIL, ELECTRIC ROTATING MACHINE AND METHOD FOR PRODUCING SAME

BACKGROUND OF THE INVENTION

The present invention relates to an electrically insulated coil, having a high shear strength and a high heat resistance and a high withstand voltage, wherein a thermosetting resin composition of a repeatedly usable one-component epoxy resin is used, and to an electric rotating machine using the coil. The invention also relates to a method for producing a totally impregnated rotating coil.

Demands for making high-voltage rotating machines, such as electric vehicles and induction motors for general industries, with a small scale, a light weight and a low cost have increasingly escalated. The methods for manufacturing the stator coil and rotor of such high-voltage rotating machines are broadly grouped as follows: (1) in a single prepreg process, after prepreg mica tapes are wound around a stack of insulated conductors, the prepreg mica tape wound around a conductor stack is heated and the resin is hardened. Then, the cured electrical insulating coil is placed into an iron core slot; in a single impregnation process a after insulating mica tapes have been wound around a stack of insulated conductors, the stack is impregnated with a thermosetting resin composition in a tank, and the resulting stack is heated and the resin is hardened. Then, the cured electrically insulated coil is placed into an iron core slot; and (3) in an total impregnation process, after the insulating mica tapes have been wound around a stack of insulated conductors, the stack is placed into an iron core slot, a wedge is inserted into the external circumferential groove of the iron core slot to connect the electrical insulating coil to the external end part of the iron core, followed by impregnating the assembly with a thermosetting resin composition in a tank, and then curing the electrical insulating coil and the iron core slot in their integrated state with a thermosetting resin composition. In the stator of the total impregnation type, the iron core and the electrically insulated coil are integrated together because the cured material of the impregnating thermosetting resin composition is filled in the space between the electrically insulated coil and the iron core slot. Therefore, the heat conductivity between the electrically insulated coil and the iron core is so high that good cooling performance can be procured and the process can be simplified, advantageously from the aspect of production of small-scale and light-weight equipment at a low cost. Thus, such a process is now being pursed as a first choice as the insulating process for small scale to medium scale high voltage electric rotating machines of high-pressure.

Thermosetting resin compositions for impregnating electrical insulating coils to be used for the single impregnation process or total impregnation process are required to satisfy the following conditions: 1. the compositions should have a low viscosity (at 10 poise or less during impregnation) so as to readily impregnate such electrically insulated coils; 2. the compositions should never generate volatile substances so as to avoid the occurrence of a void (space) at a course of heating and curing; 3. the pot life, namely the usable time, should be as long as 25 days or more; 4. the heating and curing time should be short; 5. the electrical and mechanical performance needs to be great; 6. the compatibility with the insulating tape base material should be comfortable; and 7. the cured compositions should be highly thermally resistant, in other words, the cured compositions should have short-term and long-term thermal deterioration characteristics above 155° C.

A thermosetting resin composition principally comprising an acid anhydride and an epoxy resin has been used from the aspect that, as a thermosetting resin composition for impregnating electrically insulated coils of rotating machine, the composition has a low viscosity with ready workability and handleability during impregnation and exerts a variety of great performance characteristics after curing.

The manufacture of electrically insulated coils requires more than 1000 kg of impregnating thermosetting resin composition in order to immerse the whole coils.

However, the amount of consumption at one impregnation is at most about several %, so the remaining amount should be recovered, followed by fresh addition thereof in an amount corresponding to the consumption, so as to use the composition efficiently.

Although such a thermosetting resin composition of an acid anhydride-hardening epoxy resin has a longer usable time, the resin composition requires a catalyst because of its poor curing profile. Generally, however, direct addition of a curing catalyst into a thermosetting resin composition elevates the viscosity of the thermosetting resin composition during the impregnation and storage. Thus, the composition reached an unusable state in several days.

Therefore, a so-called coating process to deposit a curing catalyst onto an insulating tape base material, as described in Japanese Patent Laid-open No. Sho 62-1124452, has been selected generally.

If an electrically insulated coil is prepared by the coating process of a curing catalyst, there tends to be a smaller amount of the curing catalyst in the thermosetting resin composition impregnated into the space between an iron core slot and the electrically insulated coil, in the thermosetting resin composition at a part spaced from the insulating tape base material layer and with a lower curing catalyst level, and in the thermosetting resin composition on the surface layer of the electrical insulating coil, the curing therein is insufficient. Therefore, satisfactory performance cannot be attained. Because the variation of the curing catalyst level is large in the insulating tape base material, the variation of the performance of the insulating layer cannot be reduced.

Research into so-called latent curing catalysts, which are stable at ambient temperature but rapidly effect curing on heating, have been conducted actively; therefore, proposals have been made for use of metal imidazolate, as described in Japanese Patent Laid-open No. Sho 48-79300; tetraonium salt, as described in Japanese Patent Laid-open No. Sho 50-110500; an addition product of imidazole and a first transition metal coordination compound, as described in Japanese Patent Laid-open No. Sho 50-11298; arsonium salt, as described in Japanese Patent Laid-open No. Sho 50-117898; chromium (III) chelate, as described in Japanese Patent Laid-open No. Sho 51-8400; metal acetylacetonate, as described in Japanese Patent Laid-open No. Sho 52-130899; organosiloxane compounds and aluminium acetylacetonate, as described in Japanese Patent Laid-open Nos. Sho 53-125500 and 56-4625; a reaction product resulting from the reaction of a metal acetylacetonate and an acid anhydride with polyethylene glycol monoalkyl ether; a reaction product resulting from the reaction of a metal acetylacetonate and an acid anhydride with polyethylene glycol monoalkyl ether, as described in Japanese Patent Laid-open No. Sho 60-108418; a reaction product resulting from the reaction of a metal acetylacetonate and an acid anhydride with an aliphatic alcohol, as described in Japanese Patent Laid-open No. Sho 61-4722; occult hydrazine curing catalysts as described in Japanese Patent Laid-open No. Sho 62-270616; an latent curing catalyst produced by the reaction of an epoxy resin compound with dialkylamine to prepare an addition compound, which is then pulverized in powder, as described in Japanese Patent Laid-open No. Sho 64-40516; and the use of a borotrifluoride complex compound and a microcapsule-type latent curing agent in combination, as described in Japanese Patent Laid-open No. Hei 3-281625.

However, these catalysts have not necessarily been satisfactory in a practical sense, because not any of these catalysts can have both a desired stability and curing performance together.

SUMMARY OF THE INVENTION

In view of the foregoing circumstances, the present invention has been attained. The object of the invention is to provide a thermosetting resin composition of a one-component type acid anhydride-hardening epoxy resin; and an electrically insulated coil, a stator and a rotating armature with a higher shear strength and a high heat resistance and high with stand voltage using the same.

Attention has been focused on the non-solvent type resin composition with higher fluidity, as described in Japanese Patent Laid-open No. Sho 52-130899. More specifically, as an impregnating resin for an electrically insulated coil of the stator for use in a total impregnation process, examination has been conducted concerning a non-solvent type resin composition which is highly fluid with an initial viscosity below 350 cps at 25° C. and containing (1). 100 parts by weight of an epoxy resin containing a first epoxy resin comprising diglycidyl ether of an aliphatic diol; and a second epoxy resin selected from the group consisting of a bisphenol type epoxy resin, bisphenol-F epoxy resin, novolak-epoxy resin, glycidyl ester epoxy resin, hydantoin epoxy resin, an alicyclic epoxy resin and a mixture thereof at a weight ratio of the first to the second epoxy resins of 1.0:0.0 to 4.0; (2). 25 to 200 parts by weight of an organic carboxylic anhydride: 3. 0.002 to 1.00 parts by weight of a metal acetylacetonate selected from the group consisting of chromium (III) acetylacetonate, titanyl acetylacetonate, aluminium (III) acetylacetonate, manganese (III) acetylacetonate, cobalt (II) acetylacetonate, cobalt (III) acetylacetonate, nickel (II) acetylacetonate, vanadium (III) acetylacetonate, zirconium (IV) acetylacetonate, sodium (I) acetylacetate, potassium (I) acetylacetate and a mixture thereof per 100 parts by weight of the epoxy resin. From any of the combinations used, consequently, poor curing performance, resin flow in the heating and curing course, poor electrical performance or insufficient curing has occurred, resulting in no compatibility between the pot life and the curing performance. In order to elevate the curing performance, a metal acetylacetonate, a reaction product from the reaction of an acid anhydride with polyethylene glycol monoalkyl ether, and a reaction product from the reaction of a methyl acetylacetonate, an acid anhydride and an aliphatic alcohol, as described in Japanese Patent Laid-open Nos. Sho 60-108418 and 61-4722, have not been used satisfactorily.

After a variety of investigations, consequently, it has been found that a specific epoxy resin with high reactivity and high heat resistance, if used as the aforementioned epoxy resin, can realize the desired compatibility between the pot life and the curing performance. Thus, the present invention has been achieved.

The object of the present invention is to provide a highly reliable electrically insulated coil for electric appliances, characterized in that the impregnating varnish thereof has a longer pot life during the production of the electrically insulated coil and is capable of forming a uniform resin layer in the insulated coil with less flow of the impregnating varnish.

DETAILED DESCRIPTION OF THE PREFERRED EMBODIMENT

Figure 1:
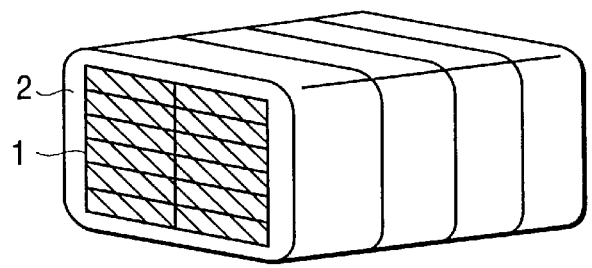
FIG. 1 is a diagram depicting the structure of an electrically insulated coil in accordance with the present invention.

The object of the present invention is attained by using as the impregnating varnish for electrically insulated coils, a thermosetting resin composition having a viscosity of 5 poise or more at 25° C., preferably 10 poise or more at 25° C., and a viscosity of 5 poise or less at 60° C. and comprising (a) a polyfunctional epoxy resin containing three or more p-(2,3-epoxypropoxy)phenyl groups and a group represented by the Chemical formula 1;

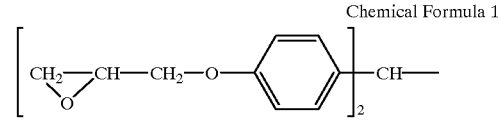

Chemical Formula 1 or an epoxy resin with a naphthalene backbone, represented by the Chemical formula 3, 4 or 5

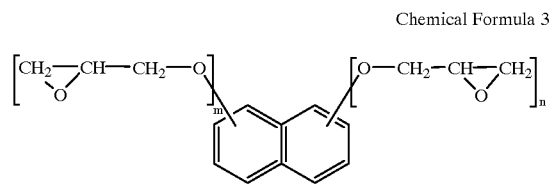

Chemical Formula 3

(wherein "n" and "m" are 1, 2, or 3);

Chemical Formula 4

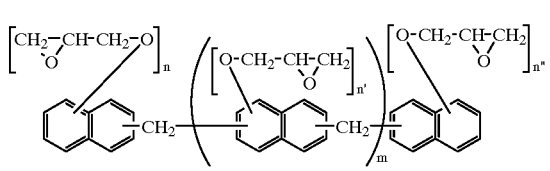

(wherein "m" is 0, 1 or 2; "n", "n'" and "n''" are 1, 2, 3 or 4; and the groups with "n", "n'" and "n''" may be attached independently to either one ring or both rings of each of the naphthalene rings); and Chemical Formula 5

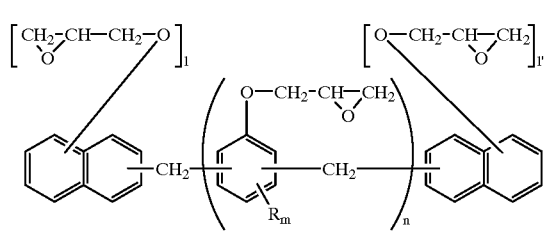

(wherein R is an alkyl group with 1 to 10 carbon atoms; "m" is 0, 1 or 2; "n" is 1, 2 or 3; "1" and "1'" and 1, 2, 3 or 4; and the groups with "n", "1" and "1'" may be attached independently to either one ring or both rings of each of the naphthalene rings) or an epoxy resin with an anthracene backbone such as diglycidyl ether of anthracene diol and triglycidyl ether of anthracene triol;

(b) a bifunctional epoxy resin containing two p-(2,3-epoxypropoxy)phenyl groups;
(c) an acid anhydride curing agent; and
(d) a metal acetonate curing catalyst represented by the Chemical formula 2

Chemical Formula 2

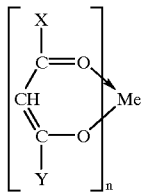

(wherein X and Y represent methyl group or phenyl group; Me represents Mn, Co, Zn or Zr; and "n" represents the coordination number) at 0.1 to 5 parts by weight per 100 parts by weight of the epoxy resins, wherein the ratio of the numbers of the epoxy resins used is 1 to 4, the ratio being represented by the following relationship:
Ratio of numbers of epoxy resins={[molar number of (b) used]×[number of epoxy resins in 1 mole of (b)]}÷{[molar number of (a) used]×[number of epoxy resins in 1 mole of (a)]}.

In the electrically insulated coils produced by the single impregnation process comprising impregnating and curing an electrically insulated coil with an insulating tape base material wound around a stack of insulated conductors formed into a defined coil shape with a thermosetting resin composition, and thereafter placing the coil into an iron core slot and the total impregnation process comprising incorporating an electrically insulated coil with an insulating tape base material wound around a stack of insulated conductors formed in a defined coil shape into an iron core slot, inserting a wedge into the external circumferential groove of the iron core slot to connect the electrical insulating coil to the external end part of the iron core, and impregnating and curing the electrically insulated coil and the iron core slot in their integrated state with a thermosetting resin composition, wherein as the thermosetting resin composition, use is made of a thermosetting resin composition having at a viscosity of 5 poise or more, preferably 10 poise or more, at 25° C. and a viscosity of 5 poise or less at 60° C. and comprising (a) a polyfunctional epoxy resin containing three or more p-(2,3-epoxypropoxy)phenyl groups and a group represented by the Chemical formula 1, as set forth previously; or an epoxy resin with a naphthalene backbone, represented by the Chemical formula 3, 4 or 5 as set forth previously or an epoxy resin with an anthracene backbone, such as diglycidyl ether of anthracene diol and triglycidyl ether of anthracene triol;
(b) a bifunctional epoxy resin containing two p-(2,3-epoxypropoxy)phenyl groups;
(c) an acid anhydride curing agent; and
(d) a metal acetonate curing catalyst represented by the Chemical formula 2 as set forth previously at 0.1 to 5 parts by weight per 100 parts by weight of the epoxy resins, wherein the ratio of the numbers of the epoxy resins used is 1 to 4, the ratio being represented by the following relationship:
Ratio of numbers of epoxy resins={[molar number of (b) used]×[number of epoxy resins in 1 mole of (b)]}÷{[molar number of (a) used]×[number of epoxy resins in 1 mole of (a)]}, whereby the electrical insulated coil can exhibit a high heat resistance and a high thermal conductivity with less flow of the thermosetting resin composition.

The present invention is summarized as follows. A first aspect of the present invention is an invention relates to a thermosetting resin composition being at a viscosity of 5 poise or more preferably 10 poise or more, at 25° C. and a viscosity of 5 poise or less at 60° C. and comprising (a) a polyfunctional epoxy resin containing three or more p-(2,3-epoxypropoxy)phenyl groups;
(b) a bifunctional epoxy resin containing two p-(2,3-epoxypropoxy)phenyl groups;
(c) an acid anhydride curing agent; and
(d) a metal acetonate curing catalyst represented by the Chemical formula 2 as set forth previously at 0.1 to 5 parts by weight per 100 parts by weight of the epoxy resins, wherein the ratio of the numbers of the epoxy resins used is 1 to 4, the ratio being represented by the following relationship:
Ratio of numbers of epoxy resins={[molar number of (b) used]×[number of epoxy resins in 1 mole of (b)]}÷{[molar number of (a) used]×[number of epoxy resins in 1 mole of (a)]}.

A second aspect of the present invention relates to a thermosetting resin composition having a viscosity of 5 poise or more at 25° C., preferably 10 poise or more at 25° C., and a viscosity of 5 poise or less at 60° C. and comprising (a) an epoxy resin with a naphthalene backbone represented by the Chemical formula 3, 4 or 5 as set forth previously; or an epoxy resin with an anthracene backbone, such as diglycidyl ether of anthracene diol and triglycidyl ether of anthracene triol (c) an acid anhydride curing agent; and (d) a metal acetonate curing catalyst represented by the Chemical formula 2 as set forth previously at 0.1 to 5 parts by weight per 100 parts by weight of the epoxy resins, wherein the ratio of the numbers of the epoxy resins used is 1 to 4, the ratio being represented by the following relationship:

Ratio of numbers of epoxy resins={[molar number of (b) used]×[number of epoxy resins in 1 mole of (b)]}÷{[molar number of (a) used]×[number of epoxy resins in 1 mole of (a)]}.

A third aspect of the present invention relates to an electrically insulated coil produced by winding an insulating tape base material around a stack of insulated conductors formed into a defined coil shape and thereafter impregnating and curing the electrically insulated coil with a thermosetting resin composition, wherein as the thermosetting resin composition, use is made of a thermosetting resin composition having at a viscosity of 5 poise or more at 25° C., preferably 10 poise or more at 25° C. and a viscosity of 5 poise or less at 60° C., and comprising (a) a polyfunctional epoxy resin containing three or more p-(2,3-epoxypropoxy)phenyl groups and a group represented by the Chemical formula 1 as set forth previously; or an epoxy resin with a naphthalene backbone, represented by the Chemical formula 3, 4 or 5 as set forth previously or an epoxy resin with an anthracene backbone, such as diglycidyl ether of anthracene diol and triglycidyl ether of anthracene triol;

(b) a bifunctional epoxy resin containing two p-(2,3-epoxypropoxy)phenyl groups;

(c) an acid anhydride curing agent; and (d) a metal acetonate curing catalyst represented by the Chemical formula 2 as set forth previously at 0.1 to 5 parts by weight per 100 parts by weight of the epoxy resins, wherein the ratio of the numbers of the epoxy resins used is 1 to 4, the ratio being represented by the following relationship:

Ratio of numbers of epoxy resins={[molar number of (b) used]×[number of epoxy resins in 1 mole of (b)]}÷{[molar number of (a) used]×[number of epoxy resins in 1 mole of (a)]}.

A fourth aspect of the present invention relates to an electrically insulated coil of a stator for a rotating machine, produced by incorporating into an iron core slot an electrically insulated coil produced by winding an insulating tape base material around a stack of insulated conductors formed into a defined coil shape, inserting a wedge into the external circumferential groove of the iron core slot to connect the electrically insulated coil to the external end part of the iron core, and thereafter impregnating, in their integrated state, the electrically insulated coil and the iron core slot with a thermosetting resin composition, and then hardening the resin, wherein as the thermosetting resin composition, use is made of a thermosetting resin composition having a viscosity of 5 poise or more at 25° C., preferably 10 poise or more at 25° C. and a viscosity of 5 poise or less at 60° C., and comprising (a) a polyfunctional epoxy resin containing three or more p-(2,3-epoxypropoxy)phenyl groups and a group represented by the Chemical formula 1 as set forth previously; or an epoxy resin with a naphthalene backbone, represented by the Chemical formula 3, 4 or 5 or an epoxy resin with an anthracene backbone, such as diglycidyl ether of anthracene diol and triglycidyl ether of anthracene triol;

(b) a bifunctional epoxy resin containing two p-(2,3-epoxypropoxy)phenyl groups;

(c) an acid anhydride curing agent; and (d) a metal acetonate curing catalyst represented by the Chemical formula 2 as set forth previously at 0.1 to 5 parts by weight per 100 parts by weight of the epoxy resins, wherein the ratio of the numbers of the epoxy resins used is 1 to 4, the ratio being represented by the following relationship:

Ratio of numbers of epoxy resins={[molar number of (b) used]×[number of epoxy resins in 1 mole of (b)]}÷{[molar number of (a) used]×[number of epoxy resins in 1 mole of (a)]}.

A fifth aspect of the present invention relates to an electrically insulated coil of a stator for a rotating machine, produced by incorporating into an iron core slot an electrically insulated coil produced by winding an insulating tape base material around a stack of insulated conductors formed into a defined coil shape, inserting a wedge into the external circumferential groove of the iron core slot to connect the electrical insulating coil to the external end part of the iron core, and thereafter impregnating and curing the electrically insulated coil and the iron core slot in their integrated state with a thermosetting resin composition, wherein as the insulating tape base material, use is made of an insulating tape base material having a heat conductivity as high as 0.3 to 0.8 W/mK and wherein as the thermosetting resin composition, use is made of a thermosetting resin composition having at a viscosity of 5 poise or more, preferably 10 poise or more, at 25° C. and a viscosity of 5 poise or less at 60° C. and comprising (a) a polyfunctional epoxy resin containing three or more p-(2,3-epoxypropoxy)phenyl groups and a group represented by the Chemical formula 1 as set forth previously; or an epoxy resin with a naphthalene backbone represented by the Chemical formula 3, 4 or 5 as set forth previously or an epoxy resin with an anthracene backbone, such as diglycidyl ether of anthracene diol and triglycidyl ether of anthracene triol;

(b) a bifunctional epoxy resin containing two p-(2,3-epoxypropoxy)phenyl groups;

(c) an acid anhydride curing agent; and (d) a metal acetonate curing catalyst represented by the Chemical formula 2 as set forth previously at 0.1 to 5 parts by weight per 100 parts by weight of the epoxy resins, wherein the ratio of the numbers of the epoxy resins used is 1 to 4, the ratio being represented by the following relationship:

Ratio of numbers of epoxy resins={[molar number of (b) used]×[number of epoxy resins in 1 mole of (b)]}÷{[molar number of (a) used]×[number of epoxy resins in 1 mole of (a)]}.

A sixth aspect of the present invention relates to an electrically insulated coil for a stator of a rotating machine, produced by incorporating into an iron core slot an electrically insulated coil produced by winding an insulating tape base material around a stack of insulated conductors formed into a defined coil shape together with a semiconductive slot liner, inserting a wedge into the external circumferential groove of the iron core slot to connect the electrical insulating coil to the external end part of the iron core, and thereafter impregnating and curing the electrical insulating coil and the iron core slot in their integrated state with a thermosetting resin composition, wherein as the semiconductive slot liner, use is made of a highly heat-conductive, semiconductive slot liner with a heat conductivity as high as 0.3 to 1.0 W/mK and a surface resistance of 0.2 to 100 kΩ; and wherein as the thermosetting resin composition, use is made of a thermosetting resin composition having a viscosity of 5 poise or more, preferably 10 poise or more, at 25° C. and a viscosity of 5 poise or less at 60° C. and comprising (a) a polyfunctional epoxy resin containing three or more p-(2,3-epoxypropoxy)phenyl groups and a group represented by the Chemical formula 1 as set forth previously; or an epoxy resin with a naphthalene backbone, represented by the Chemical formula 3, 4 or 5 as set forth previously or an epoxy resin with an anthracene backbone, such as diglycidyl ether of anthracene diol and triglycidyl ether of anthracene triol;

(b) a bifunctional epoxy resin containing two p-(2,3-epoxypropoxy)phenyl groups;

(c) an acid anhydride curing agent; and (d) a metal acetonate curing catalyst represented by the Chemical formula 2 as set forth previously at 0.1 to 5 parts by weight per 100 parts by weight of the epoxy resins, wherein the ratio of the numbers of the epoxy resins used is 1 to 4, the ratio being represented by the following relationship:

Ratio of numbers of epoxy resins={[molar number of (b) used]×[number of epoxy resins in 1 mole of (b)]}÷{[molar number of (a) used]×[number of epoxy resins in 1 mole of (a)]}.

A seventh aspect of the present invention relates to a rotating machine comprising a stator and a rotor, produced by incorporating into an iron core slot an electrical insulating coil produced by winding an insulating tape base material around a stack of insulated conductors formed into a defined coil shape, inserting a wedge into the external circumferential groove of the iron core slot to connect the electrical insulating coil to the external end part of the iron core, and thereafter impregnating and curing the electrical insulating coil and the iron core slot in their integrated state with a thermosetting resin composition, wherein as the thermosetting resin composition, use is made of a thermosetting resin composition having a viscosity of 5 poise or more, preferably 10 poise or more, at 25° C. and a viscosity of 5 poise or less at 60° C. and comprising (a) a polyfunctional epoxy resin containing three or more p-(2,3-epoxypropoxy)phenyl groups and a group represented by the Chemical formula 1 as set forth previously; or an epoxy resin with a naphthalene backbone, represented by the Chemical formula 3, 4 or 5 as set forth previously or an epoxy resin with an anthracene backbone, such as diglycidyl ether of anthracene diol and triglycidyl ether of anthracene triol;

(b) a bifunctional epoxy resin containing two p-(2,3-epoxypropoxy)phenyl groups;

(c) an acid anhydride curing agent; and (d) a metal acetonate curing catalyst represented by the Chemical formula 2 as set forth previously at 0.1 to 5 parts by weight per 100 parts by weight of the epoxy resins, wherein the ratio of the numbers of the epoxy resins used is 1 to 4, the ratio being represented by the following relationship:

Ratio of numbers of epoxy resins={[molar number of (b) used]×[number of epoxy resins in 1 mole of (b)]}÷{[molar number of (a) used]×[number of epoxy resins in 1 mole of (a)]}.

Any polyfunctional compound containing three or more p-(2,3-epoxypropoxy)phenyl groups and a group represented by the previously set forth Chemical formula 1 may be used, with no specific limitation, as the polyfunctional epoxy resin containing three or more p-(2,3-epoxypropoxy) phenyl groups and a group represented by the previously set forth Chemical formula 1; in accordance with the present invention. Such compound includes for example polyfunctional epoxy resins such as tris[p-(2,3-epoxypropoxy) phenyl]methane, 1,1,2-tris[p-(2,3-epoxypropoxy)phenyl] ethane, 1,1,2-tris[p-(2,3-epoxypropoxy)phenyl]propane, 1,1,3-tris[p-(2,3-epoxypropoxy)phenyl]propane, 1,1,3-tris[p-(2,3-epoxypropoxy)phenyl]butane, 1,1,2,2-tetrakis[p-(2,3-epoxypropoxy)phenyl]ethane, 1,1,3,3-tetrakis[p-(2,3-epoxypropoxy)phenyl]propane and the like. From the aspect of heat resistance and viscosity, preference is given to tris[p-(2,3-epoxypropoxy)phenyl]methane, 1,1,3-tris[p-(2,3-epoxypropoxy)phenyl]butane, 1,1,2,2-tetrakis[p-(2,3-epoxypropoxy)phenyl]ethane, 1,1,3,3-tetrakis[p-(2,3-epoxypropoxy)phenyl]propane, 1,1,3-tris[p-(2,3-epoxypropoxy)phenyl]propane, among them.

Chemical Formula 3

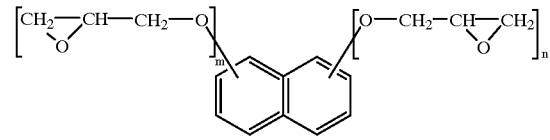

(wherein "n" and "m" are 1, 2 or 3.)

Chemical Formula 4

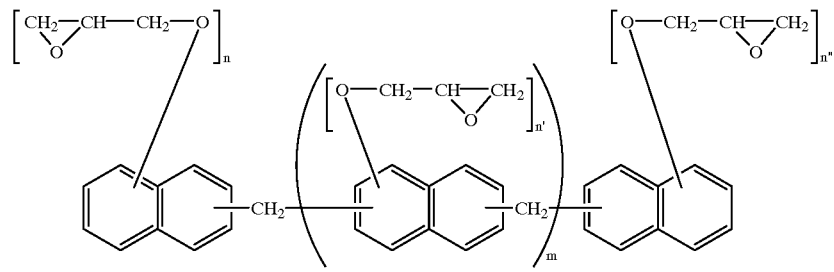

(wherein "m" is 0, 1 or 2; "n", "n'" and "n''" are 1, 2, 3 or 4; and the groups with "n", "n'" and "n''" may satisfactorily be attached independently to either one ring or both rings of each of the naphthalene rings.)

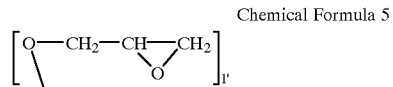

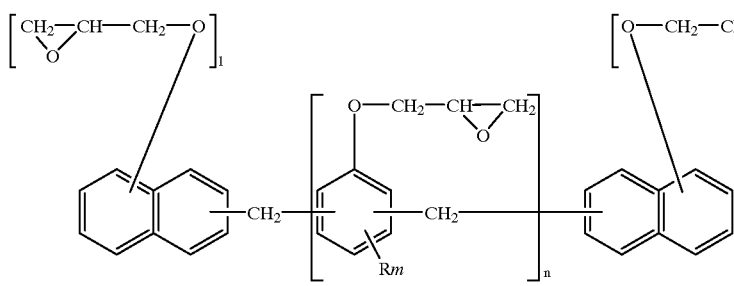

(wherein R is an alkyl group with 1 to 10 carbon atoms; "m" is 0, 1 or 2; "n" is 1, 2 or 3; "l" and "l'" are 1, 2, 3 or 4; and the groups with "n", "l" and "l'" may satisfactorily be attached independently to either one ring or both rings of each of the naphthalene rings.)

Examples of the epoxy resin with the naphthalene backbone being represented by the previously set forth Chemical formulas 3, 4 or 5 and the epoxy resin with the anthracene backbone, such as diglycidyl ether of anthracene diol and triglycidyl ether of anthracene triol, to be used in accordance with the present invention, are described more specifically below. The epoxy resin with the naphthalene backbone, represented by the Chemical formula 3, includes diglycidyl ether of dihydroxynaphthalenes such as 1,6-dihydroxynaphthalene, 1,2-dihydroxynaphthalene, 1,3-dihydroxynaphthalene, 1,4-dihydroxynaphthalene, 1,5-dihydroxynaphthalene, 1,7-dihydroxynaphthalene, 1,8-dihydroxynaphthalene, 2,3-dihydroxynaphthalene, 2,6-dihydroxynaphthalene, and 2,7-dihydroxynaphthalene; triglycidyl ether of trihydroxynaphthalenes such as 1,2,3-trihydroxynaphthalene, 1,2,4-trihydroxynaphthalene, 1,2,5-trihydroxynaphthalene, 1,2,6-trihydroxynaphthalene, 1,2,7-trihydroxynaphthalene, 1,2,8-trihydroxynaphthalene, 1,3,5-trihydroxynaphthalene, 1,3,6-trihydroxynaphthalene, 1,3,7-trihydroxynaphthalene, 1,3,8-trihydroxynaphthalene, 1,4,5-trihydroxynaphthalene, 1,4,6-trihydroxynaphthalene, 1,4,7-trihydroxynaphthalene, 1,6,7-trihydroxynaphthalene, and 2,3,6-trihydroxynaphthalene; tetradiglycidyl ether of tetrahydroxynaphthalenes such as 1,3,6,7-tetrahydroxynaphthalene and 1,2,6,7-tetrahydroxynaphthalene. The epoxy resin with the naphthalene backbone, represented by the Chemical formula 4, includes dihydroxynaphthalene, trihydroxynaphthalene and tetrahydroxynaphthalene singly or polyglycidyl ether of a novolak type resin of a mixture thereof with formaldehyde. Additionally, the dihydroxynaphthalene, trihydoxynaphthalene and tetrahydroxynaphthalene alone or polyglycidyl ether of a novolak-type epoxy resin of a mixture thereof with acetoaldehyde or the like, is also useful. As the epoxy resin with the naphthalene backbone, represented by the Chemical formula 5, polyglycidyl ether of a novolak type resin comprising a mixture of the dihydroxynaphthalene, trihydroxynaphthalene and tetrahydroxynaphthalene with phenol, aminophenol, cresol and the like and formaldehyde, is useful. Still further, polyglycidyl ether of a novolak type resin comprising a mixture of the dihydroxynaphthalene, trihydroxynaphthalene, and tetrahydroxynaphthalene with phenol, aminophenol, cresol and the like and acetoaldehyde and the like, is also useful. A mixture of those resins represented by the Chemical formulas 3, 4 and 5 is also effective. Among them, preference is given to the epoxy resins represented by the Chemical formula 4 and 5 and a mixture of the resins with 1,6-dihydroxynaphthalene diglycidyl ether, from the aspect of heat resistance and viscosity. If necessary, additionally, the addition of amines and phenols or a modification thereof may satisfactorily be carried out.

Any bifunctional epoxy resin containing two epoxy groups may be used satisfactorily, with no specific limitation, in accordance with the present invention. Such a compound includes, for example, diglycidyl ether of bisphenol A, diglycidyl ether of bisphenol F, diglycidyl ether of bisphenol AD, diglycidyl ether of hydrogenated bisphenol A, diglycidyl ether of 2,2-(4-hydroxyphenyl)nonadecane, diphenyl ether of 4,4'-bis(2,3-epoxypropyl)diphenyl ether, 3,4-epoxycyclohexylmethyl-(3,4-epoxy)cyclohexane carboxylate, 4-(1,2-epoxypropyl)-1,2-epoxycylohexane, 2-(3,4-epoxy)cyclohexyl-5,5-spiro(3,4-epoxy)cyclohexane-m-dioxane, 3,4-epoxy-6-methylcyclohexylmethyl-4-epoxy-6-methylcyclohexane carboxylate and the like. Among them, bifunctional epoxy resins containing two p-(2,3-epoxypropoxy)phenyl groups, such as diglycidyl ether of bisphenol A, diglycidyl ether of bisphenol F and diglycidyl ether of bisphenol AD, are useful from the aspect of heat resistance and viscosity.

The metal acetonate curing catalysts represented by the previously set forth Chemical formula 2, to be used in accordance with the present invention, include curing catalysts selected from the group consisting of manganese (III) acetylacetonate, manganese (III) benzoylacetonate, cobalt (II) acetylacetonate, cobalt (III) acetylacetonate, cobalt (II) benzoylacetonate, zinc (II) acetylacetonate, chromium (III) acetylacetonate, titanyl acetylacetonate, aluminium (III) acetylacetonate, nickel (II) acetylacetonate, vanadium (III) acetylacetonate, zirconium (IV) acetylacetonate, sodium (I) acetylacetonate, potassium (I) acetylacetonate and a mixture thereof. The metal acetonate curing catalysts may be blended at any ratio, with no specific limitation, but preferably are blended at 0.1 to 5 parts by weight per 100 parts by weight of the epoxy resins. If the amount is much, however, the pot life tends to be shorter, while the resin may tend to flow if the amount is too less.

Any general acid anhydride may be used, with no specific limitation, in accordance with the present invention. Such a compound includes for example methylhexahydrophthalic anhydride, hexahydrophthalic anhydride, methyltetrahydrophthalic anhydride, tetrahyd-ophthalic anhydride, nadic anhydride, methylnadic anhydride, dodecylsuccinic anhydride, succinic anhydride, octadecylsuccinic anhydride, maleic anhydride, benzophenone tetracarboxylic anhydride singly, or a mixture thereof. Among them, preferably, the compound includes nadic anhydride and methylnadic anhydride from the aspect of heat resistance. From the aspect of heat resistance, the ratio of blending of an acid anhydride into the epoxy resin is preferably at 0.8 to 1.2 in equivalent ratio.

The ratio of a polyfunctional epoxy resin with three or more functional groups blended with a bifunctional epoxy resin is not with specific limitation, but preferably, 0.1 to 19 parts by weight of a bifunctional epoxy resin is blended with one part by weight of a polyfunctional epoxy resin. If the polyfunctional epoxy resin is much, the viscosity prior to curing tends to increase, involving the tendency that the resulting composition may turn hard and fragile; adversely, when the bifunctional epoxy resin is much, the viscosity decreases, while the heat resistance tends to be reduced. From the aspect of the compatibility between viscosity and heat resistance, effectively, 1 to 9 parts by weight of a bifunctional epoxy resin should be blended with one part by weight of a polyfunctional epoxy resin, in particular.

The ratio of blending (a) a polyfunctional epoxy resin containing three or more p-(2,3-epoxypropoxy)phenyl groups and a group represented by the previously set forth Chemical formula 1, or an epoxy resin with a naphthalene backbone or an epoxy resin with an anthracene backbone, such as diglycidyl ether of anthracene diol and triglycidyl ether of anthracene triol, represented by the previously set forth Chemical formula 3, 4 or 5 to (b) a bifunctional epoxy resin containing two p-(2,3-epoxypropoxy)phenyl groups, is represented by the following relationship:
Ratio of numbers of epoxy resins={[molar number of (b) used]×[number of epoxy resins in 1 mole of (b)]}÷{[molar number of (a) used]×[number of epoxy resins in 1 mole of (a)]}. From the aspect of heat resistance, viscosity and pot life, preferably, the ratio of the numbers of the epoxy resins to be used is 1 to 4.

In order to produce an electrically insulated coil with a high heat resistance and with less flow of a thermosetting resin composition, the viscosity of the thermosetting resin composition is 5 poise or more, preferably 10 poise or more, at 25° C. and 5 poise or less at 60° C.

The insulating base material to be used in accordance with the present invention includes a mica sheet, a polyimide sheet, a polyamide sheet, a polyparabenic acid sheet, a polyimide ether sheet, a polyether ether ketone sheet, a polysulfide sheet and the like. Mica includes for example non-calcined soft composite mica, non-calcined hard composite mica, calcined hard composite mica, calcined soft composite mica, synthetic mica or aramide-mixed mica. Furthermore, highly heat-conductive mica with inorganic fillers, such as silica, alumina, and boron nitride, dispersed therein, is also useful, as described in Japanese Patent Publication No. Sho 56-38006. Inorganic fillers can be also added to the binder. Mica in itself has a good insulating performance, but a lower strength, and therefore, mica can be wound around a conductor only with much difficulty. To impart mica with strength, therefore, mica should be attached to a reinforcing material by means of a binder. The reinforcing material for mica includes for example glass fiber, aramide, aramide-mixed paper, films of polyamide imide, polyester, polyimide ether, polyether ether ketone, polyether sulfone, polyparabenic acid, polysulfide or polyimide; and films with a higher heat conductivity, produced by filling silica or alumina into the aforementioned films. Among them, glass fiber and polyimide film are preferable as the reinforcing material for mica from the aspect of heat resistance. Particularly, silica- or alumina-filled glass fiber and polyimide film with an increased thermal conductivity, are preferable. As such a binder, any binder may be satisfactory as long as the binder can bond mica to the reinforcing material. Such a binder includes epoxy resin, silicone resin, alkyd resin, polyester resin, epoxy ester resin and the like. From the aspect of heat resistance, among them, a binder which is reactive with the thermosetting resin of the present invention is particularly preferable.

If the insulating base material is hard, additionally, the insulating base material may satisfactorily be softened for use.

The binder should be contained in any amount in the insulating base material with no specific limitation, but preferably is provided at 3 to 40% by weight, particularly at 5 to 20% by weight. If the binder content is high, the amount of the thermosetting resin composition in the impregnation is so small that the heat resistance tends to decrease. If the binder content is less, alternatively, the adhesive strength is so deteriorated that the insulating base material tends to peel off, which means that the base material is able to be wound back on a conductor only with much difficulty.

So as to elevate the adhesive strength of the insulating base material, treatment of the mica or the reinforcing agent with a surfactant may be effected satisfactorily or a surfactant may be added to the binder to procure better performance. Such a surfactant includes for example silane surfactants such as γ-chloropropyltrimethoxysilane, vinyltrichlorosilane, vinyltriethoxysilane, vinyltrimethoxysilane, vinyl tris (β-methoxyethoxy) silane, γ-methacryloxypropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, and γ-ureidopropyltriethoxysilane; titanate surfactants such as isopropylisostearoyltitanate, isopropyltrioctanoyltitanate, isopropylmethacryloylisostearoyltitanate, isopropyltridodecyltitanate, isopropylisostearoyldiacryltitanate, isopropyl tris (dioctylphosphate)titanate, isopropyltricumylphenyltitanate, isopropyl tris(dioctylpyrophosphate)titanate, isopropyl tris (n-aminoethyl-aminoethyl)titanate, tetraisopropyl bis (dioctylphosphite)titanate, tetraoctyl bis (didodecylphosphite)titanate, tetra(2,2-diallyloxymethyl-1-butyl) bis(ditridecyl)phosphitetitanate, di-isostearoylethylene titanate, and bis (dioctylpyrophosphate)ethylene titanate; aluminium surfactants such as ethyl acetoacetate aluminium diisopropylate and aluminium tris(ethyl acetoacetate); or zirconium surfactants or the like. Among them, preference is given to γ-glycidoxypropyltrimethoxysilane, β-3,4-epoxycyclohexyl) ethyltrimethoxysilane, γ-mercaptopropyltrimethoxysilane, γ-aminopropyltriethoxysilane, N-β-(aminoethyl)-γ-aminopropyltrimethoxysilane, isopropylisostearoyltitanate, isopropyltrioctanoyltitanate, ethyl acetoacetate aluminium diisopropylate and aluminium tris(ethyl acetoacetate). Two or more of the surfactants may satisfactorily be mixed together.

If necessary, furthermore, monoepoxy resins such as cyclohexene vinyl monooxide, octylene oxide, butyl glycidyl ether, styrene oxide, phenylglycidyl ether, glycidyl methacrylate, and allyl glycidyl ether may be added as a diluent. However, generally, diluents have an effect of lowering viscosity, which is accompanied by the decrease of heat resistance. Therefore, the amount of the diluents should be suppressed to a low level.

As such a filler, hydrated alumina, hydrated magnesium, calcium carbonate, zirconium silicate, calcium silicate, talc, clay, mica, glass fiber powder and the like may be added as the filler, other than silica powder, quartz glass powder and alumina powder.

The present invention will now be described in more detail with reference to various examples, but the invention is not limited to these examples.

The abbreviations of the epoxy resins, curing agents and curing catalysts used in the examples are as shown below.

1,2-DGON; 1,2-diglycidyloxynaphthalene; epoxy equivalent of 141
1,3-DGON; 1,3-diglycidyloxynaphthalene; epoxy equivalent of 141
1,4-DGON; 1,4-diglycidyloxynaphthalene; epoxy equivalent of 141
1,5-DGON; 1,5-diglycidyloxynaphthalene; epoxy equivalent of 141
1,6-DGON; 1,6-diglycidyloxynaphthalene; epoxy equivalent of 141
1,7-DGON; 1,7-diglycidyloxynaphthalene; epoxy equivalent of 141
1,8-DGON; 1,8-diglycidyloxynaphthalene; epoxy equivalent of 141
2,3-DGON; 2,3-diglycidyloxynaphthalene; epoxy equivalent of 141
2,6-DGON; 2,6-diglycidyloxynaphthalene; epoxy equivalent of 141
2,7-DGON; 2,7-diglycidyloxynaphthalene; epoxy equivalent of 141
PDGON; polymerized 1,6-diglycidyloxynaphthalene; epoxy equivalent of 250 and softening point of 67° C.
GONDGONM; 1-(2-glycidyloxy-1-naphthyl)-1-(2',7'-diglycidyloxy-1-naphthyl)methane; epoxy equivalent of 187 and softening point of 75° C.
BDGON; 1,1-bis(2,7-diglycidyloxy-1-naphthyl)methane; epoxy equivalent of 161 and softening point of 91° C.
BDGOE; 1,1-bis(2,7-diglycidyloxy-1-naphthyl)ethane; epoxy equivalent of 165 and softening point of 91° C.
PGENCN; polyglicidyl ether of novolak of a mixture of cresol and 2-hydroxynaphthalene; epoxy equivalent of 225 and softening point of 84° C.
TKEPPE; 1,1,2,2-tetrakis[p-(2,3-epoxypropoxy)phenyl]methane; epoxy equivalent of 192
TEPPM; 1,1,3-tris[p-(2,3-epoxypropoxy)phenyl]methane; epoxy equivalent of 161
TEPPB; 1,1,3-tris[p-(2,3-epoxypropoxy)phenyl]butane; epoxy equivalent of 196
BPAN; Novolak-type epoxy of bisphenol A; epoxy equivalent of 198
DGEBA; diglycidyl ether of bisphenol A; epoxy equivalent of 175
ECHMECC; 3,4-epoxycylohexylmethyl-(3,4-epoxy)cyclohexane carboxylate; epoxy equivalent of 138
DGEBF; diglycidyl ether of bisphenol F; epoxy equivalent of 170
POEPN; polyglycidyl ether of phenol Novolak; epoxy equivalent of 170
MHAC-P; methylnadic anhydride; acid anhydride equivalent of 178
HN-5500; methylhexahydrophthalic anhydride; acid anhydride equivalent of 168

TABLE 1

| Examples | | 1 | 2 | 3 | 4 | 5 | 6 | 7 | 8 |
|---|---|---|---|---|---|---|---|---|---|
| Epoxy resins | (a) | 1,2-DGON (100) | 1,3-DGON (100) | 3,4-DGON (100) | 1,5-DGON (100) | 1,6-DGON (100) | 1,7-DGON (100) | 1,3-DGON (100) | 2,3-DGON (100) |
| | (b) | DGEBA (124) | DGEBA (124) | DGEBA (124) | DGEBA (124) | DGEBA (124) | DGEBA (124) | DGEBA (124) | DGEBA (124) |
| $\frac{(b)}{(a)}$ | | 1.0 | 1.0 | 1.0 | 1.0 | 1.0 | 1.0 | 1.0 | 1.0 |
| Curing agents | | MMAC-P (253) | MMAC-P (253) | MMAC-P (253) | MMAC-P (253) | MMAC-P (253) | MMAC-P (253) | MMAC-P (253) | MMAC-P (253) |
| Curing catalysts | | Mn(III)AA (1.12) | Mn(III)AA (1.12) | Mn(III)AA (1.12) | Mn(III)AA (1.12) | Mn(III)AA (1.12) | Mn(III)AA (1.12) | Mn(III)AA (1.12) | Mn(III)AA (1.12) |
| Viscosity (P) at 25° C. | | $\geq 5$ | $\geq 5$ | $\geq 5$ | $\geq 5$ | $\geq 5$ | $\geq 5$ | $\geq 5$ | $\geq 5$ |
| Viscosity (P) at 60° C. | | $\leq 5$ | $\leq 5$ | $\leq 5$ | $\leq 5$ | $\leq 5$ | $\leq 5$ | $\leq 5$ | $\leq 5$ |
| Pot life (day) | | >30 | >30 | >30 | >30 | >30 | >30 | >30 | >30 |
| Heat-resistant temperature (° C.) | | 285 | 203 | 104 | 205 | 101 | 104 | 205 | 205 |

TABLE 2

| Examples | | 9 | 10 | 11 | 12 | 13 | 14 | 15 | 16 |
|---|---|---|---|---|---|---|---|---|---|
| Epoxy resins | (a) | 2,3-DGON (100) | 1,7-DGON (100) | PDGON (100) | GONDEON (100) | BOGON (100) | PGENON (100) | PFAM (100) | PFAM (100) |
| | (b) | DGEBA (114) | DGEBA (124) | DGEBA (140) | DGEBA (385) | DGEBA (717) | DGEBA (150) | DGEBA (68) | DGEBA (113) |
| $\frac{(b)}{(a)}$ | | 1.0 | 1.0 | 1.0 | 2.0 | 1.0 | 1.0 | 1.0 | 1.0 |

TABLE 2-continued

| Examples | 9 | 10 | 11 | 12 | 13 | 14 | 15 | 16 |
|---|---|---|---|---|---|---|---|---|
| Curing agents | MMAC-P (252) | MMAC-P (253) | MMAC-P (214) | MMAC-P (253) | MMAC-P (333) | MMAC-P (235) | MMAC-P (106) | MMAC-P (230) |
| Curing catalysts | Mn(III)AA (2.34) | Mn(III)AA (2.24) | Mn(III)AA (2.40) | Mn(III)AA (2.61) | Mn(III)AA (3.17) | Mn(III)AA (2.54) | Mn(III)AA (1.86) | Mn(III)AA (2.11) |
| Viscosity (P) at 25° C. | ≧5 | ≧5 | ≧5 | ≧5 | ≧5 | ≧5 | ≧5 | ≧5 |
| Viscosity (P) at 60° C. | ≦5 | ≦5 | ≦5 | ≦5 | ≦5 | ≦5 | ≦5 | ≦5 |
| Pot life (day) | >30 | >30 | >30 | >30 | >30 | >30 | >30 | >30 |
| Heat-resistant temperature (° C.) | 104 | 203 | 204 | 203 | 204 | 204 | 205 | 105 |

TABLE 3

| | | Comparative Examples 1 | Examples 17 | Examples 18 | Examples 19 | Examples 20 | Comparative Examples 2 | Examples 21 | Examples 22 |
|---|---|---|---|---|---|---|---|---|---|
| Epoxy resins | (a) | PGENCN (100) | PGENCN (100) | PGENCN (100) | PGENCN (100) | PGENCN (100) | PGENCN (100) | PGENCN (100) | PGENCN (100) |
| | (b) | DGEBA (53) | DGEBA (79) | DGEBA (135) | DGEBA (231) | DGEBA (308) | DGEBA (385) | DGEBA (231) | DGEBA (731) |
| | $\frac{(b)}{(a)}$ | 0.7 | 1.0 | 2.3 | 3.0 | 1.0 | 3.0 | 3.0 | 3.0 |
| Curing agents | | MMAC-P (132) | MMAC-P (257) | MMAC-P (156) | MMAC-P (313) | MMAC-P (392) | MMAC-P (470) | MMAC-P (313) | MMAC-P (313) |
| Curing catalysts | | Mn(III)AA (1.93) | Mn(III)AA (1.77) | Mn(III)AA (2.15) | Mn(III)AA (3.31) | Mn(III)AA (4.08) | Mn(III)AA (1.85) | Mn(III)AA (1.00) | Mn(III)AA (12.1) |
| Viscosity (P) at 25° C. | | ≧5 | ≧5 | ≧5 | ≧5 | ≧5 | ≧5 | ≧5 | ≧5 |
| Viscosity (P) at 60° C. | | ≦5 | ≦5 | ≦5 | ≦5 | ≦5 | ≦5 | ≦5 | ≦5 |
| Pot life (day) | | >30 | >30 | >30 | >30 | >30 | >30 | >30 | >30 |
| Heat-resistant temperature (° C.) | | 195 | 207 | 210 | 215 | 210 | 200 | 215 | 217 |

TABLE 4

| Examples | | 23 | 24 | 25 | 26 | 27 | 28 | 29 | 30 |
|---|---|---|---|---|---|---|---|---|---|
| Epoxy resins | (a) | TKEPPE (100) | TKEPPE (100) | TKEPPE (100) | TKEPPE (100) | TKEPPE (100) | TKEPPE (100) | TKEPPE (100) | TKEPPE (100) |
| | (b) | DGEBA (272) | DGEBA (272) | DGEBA (272) | DGEBA (272) | DGEBA (272) | DGEBA (272) | DGEBA (272) | DGEBA (272) |
| | $\frac{(b)}{(a)}$ | 3.0 | 3.0 | 3.0 | 3.0 | 3.0 | 3.0 | 3.0 | 3.0 |
| Curing agents | | MMAC-P (385) | MMAC-P (385) | MMAC-P (385) | MMAC-P (385) | MMAC-P (385) | MMAC-P (385) | MMAC-P (385) | MMAC-P (385) |
| Curing catalysts | | Mn(III)AA (2.73) | Co(III)AA (2.73) | Co(III)AA (2.73) | Co(II)AA (2.73) | ViAA (2.73) | ZrAA (2.73) | VAA (2.73) | Mn(III)AA (2.73) |
| Viscosity (P) at 25° C. | | ≧5 | ≧5 | ≧5 | ≧5 | ≧5 | ≧5 | ≧5 | ≧5 |
| Viscosity (P) at 60° C. | | ≦5 | ≦5 | ≦5 | ≦5 | ≦5 | ≦5 | ≦5 | ≦5 |
| Pot life (day) | | >30 | >30 | >30 | >30 | >30 | >30 | >30 | >30 |
| Heat-resistant temperature (° C.) | | 220 | 219 | 215 | 215 | 170 | 210 | 210 | 221 |

TABLE 5

|  |  | Comparative Examples 3 | Examples 31 | Examples 32 | Examples 33 | Examples 34 | Examples 35 | Examples 36 | Comparative Examples 4 |
|---|---|---|---|---|---|---|---|---|---|
| Epoxy resins | (a) | TEPPM (100) | TEPPM (100) | TEPPM (100) | TEPPM (100) | TEPPM (100) | TEPPM (100) | TEPPM (100) | TEPPM (100) |
|  | (b) | DGEBA (70) | DGEBA (100) | DGEBA (217) | DGEBA (272) | DGEBA (376) | DGEBA (380) | DGEBA (435) | DGEBA (345) |
|  | $\frac{(b)}{(a)}$ | 0.0 | 1.0 | 2.0 | 2.5 | 3.0 | 3.5 | 4.0 | 5.0 |
| Curing agents |  | MMAC-P (381) | MMAC-P (121) | MMAC-P (331) | MMAC-P (385) | MMAC-P (441) | MMAC-P (485) | MMAC-P (552) | MMAC-P (562) |
| Curing catalysts |  | Mn(III)AA (1.70) | Mn(III)AA (2.00) | Mn(III)AA (3.17) | Mn(III)AA (3.71) | Mn(III)AA (4.26) | Mn(III)AA (4.50) | Mn(III)AA (3.35) | Mn(III)AA (6.43) |
| Viscosity (P) at 25° C. |  | ≧5 | ≧5 | ≧5 | ≧5 | ≧5 | ≧5 | ≧5 | ≧5 |
| Viscosity (P) at 60° C. |  | ≦5 | ≦5 | ≦5 | ≦5 | ≦5 | ≦5 | ≦5 | ≦5 |
| Pot life (day) |  | >30 | >30 | >30 | >30 | >30 | >30 | >30 | >30 |
| Heat-resistant temperature (° C.) |  | 204 | 206 | 115 | 282 | 220 | 215 | 215 | 180 |

TABLE 6

|  |  | Comparative Examples 5 | Examples 37 | Examples 38 | Examples 39 | Examples 40 | Examples 42 | Examples 43 | Comparative Examples 6 |
|---|---|---|---|---|---|---|---|---|---|
| Epoxy resins | (a) | TEPPM (100) | TEPPM (100) | TEPPM (100) | TEPPM (100) | TEPPM (100) | TEPPM (100) | TEPPM (100) | TEPPM (100) |
|  | (b) | DGEBA (328) | DGEBA (328) | DGEBA (328) | DGEBA (328) | DGEBA (328) | DGEBA (328) | DGEBA (328) | DGEBA (328) |
|  | $\frac{(b)}{(a)}$ | 3.0 | 3.0 | 3.0 | 3.0 | 3.0 | 3.0 | 3.0 | 3.0 |
| Curing agents |  | MMAC-P (441) | MMAC-P (441) | MMAC-P (441) | MMAC-P (441) | MMAC-P (441) | MMAC-P (441) | MMAC-P (441) | MMAC-P (441) |
| Curing catalysts |  | Mn(III)AA (0.3) | Mn(III)AA (0.5) | Mn(III)AA (1.0) | Mn(III)AA (3.0) | Mn(III)AA (0.52) | Mn(III)AA (17.0) | Mn(III)AA (21.3) | Mn(III)AA (30.1) |
| Viscosity (P) at 25° C. |  | ≧5 | ≧5 | ≧5 | ≧5 | ≧5 | ≧5 | ≧5 | ≧5 |
| Viscosity (P) at 60° C. |  | ≦5 | ≦5 | ≦5 | ≦5 | ≦5 | ≦5 | ≦5 | ≦5 |
| Pot life (day) |  | >30 | >30 | >30 | >30 | >30 | >30 | >30 | >30 |
| Heat-resistant temperature (° C.) |  | 104 | 215 | 115 | 220 | 221 | 210 | 218 | 201 |

TABLE 7

|  |  | Examples 44 | Examples 45 | Examples 46 | Examples 47 | Examples 48 | Examples 49 | Examples 50 | Examples 51 |
|---|---|---|---|---|---|---|---|---|---|
| Epoxy resins | (a) | TEPPM (100) | TEPPM (100) | TEPPM (100) | TEPPM (100) | TEPPM (100) | TEPPM (100) | TEPPM (100) | TEPPM (100) |
|  | (b) | DGEBA (326) | DGEBA (326) | DGEBA (326) | DGEBA (326) | DGEBA (326) | DGEBA (326) | DGEBA (326) | DGEBA (326) |
|  | $\frac{(b)}{(a)}$ | 3.0 | 3.0 | 3.0 | 3.0 | 3.0 | 3.0 | 3.0 | 3.0 |
| Curing agents |  | MMAC-P (441) | MMAC-P (441) | MMAC-P (441) | MMAC-P (441) | MMAC-P (441) | MMAC-P (441) | MMAC-P (441) | MMAC-P (441) |
| Curing catalysts |  | Mn(III)AA (4.76) | Co(III)AA (4.26) | Co(II)AA (4.16) | Co(II)AA (4.26) | TiAA (4.26) | ZrAA (4.16) | TAA (4.16) | Mn(III)AA (0.52) |
| Viscosity (P) at 25° C. |  | ≧5 | ≧5 | ≧5 | ≧5 | ≧5 | ≧5 | ≧5 | ≧5 |
| Viscosity (P) at 60° C. |  | ≦5 | ≦5 | ≦5 | ≦5 | ≦5 | ≦5 | ≦5 | ≦5 |
| Pot life (day) |  | >30 | >30 | >30 | >30 | >30 | >30 | >30 | 70 |
| Heat-resistant temperature (° C.) |  | 210 | 217 | 213 | 710 | 271 | 710 | 120 | 221 |

TABLE 8

| | | Examples 52 | Examples 53 | Examples 54 | Examples 55 | Examples 56 | Comparative Examples 7 | Comparative Examples 8 |
|---|---|---|---|---|---|---|---|---|
| Epoxy resins | (a) | TEPPM (100) | TEPPM (100) | TEPPM (100) | TEPPM (100) | TEPPM (100) | — | — |
| | (b) | DGEBA (326) | DGEBA (326) | DGEBA (326) | DGEBA (326) | DGEBA (317) | DGEBA (100) | DGEBA (100) ECHIECC (100) |
| | $\frac{(b)}{(a)}$ | 3.0 | 3.0 | 3.0 | 3.0 | 3.0 | — | — |
| Curing agents | | HN-5500 (417) | HN-2200 (417) | MMAC-P (487) | MMAC-P (354) | MMAC-P (441) | MMAC-P (102) | MMAC-P (131) |
| Curing catalysts | | Mn(III)AA (4.26) | Mn(III)AA (4.26) | Mn(III)AA (4.26) | Mn(III)AA (4.26) | Mn(III)AA (4.17) | Mn(III)AA (1.00) | Mn(III)AA (2.00) |
| Viscosity (P) at 25° C. | | ≧5 | ≧5 | ≧5 | ≧5 | ≧5 | ≧5 | ≧5 |
| Viscosity (P) at 60° C. | | ≦5 | ≦5 | ≦5 | ≦5 | ≦5 | ≦5 | ≦5 |
| Pot life (day) | | >30 | >30 | >30 | >30 | >30 | >30 | >30 |
| Heat-resistant temperature (° C.) | | 215 | 214 | 220 | 220 | 221 | 100 | 150 |

HN-2200; methyltetrahydrophthalic anhydride; acid anhydride equivalent of 166
Mn(III)AA; manganese (III) acetylacetonate
Mn(III) BA; manganese (III) benzoyl acetonate
Co(II) AA; cobalt (II) acetylacetonate
Co(III) AA; cobalt (III) acetylacetonate
Co(II) BA; cobalt (II) benzoylacetonate
TiAA; titanyl acetylacetonate
ZrAA; zirconium (IV) acetylacetonate
VAA; vanadium (III) acetylacetonate

EXAMPLES 1 TO 56 AND COMPARATIVE EXAMPLES 1 TO 8

1. Preparation of thermosetting resin compositions and assessment of the performance
   Table 1
   Examples Epoxy resins Curing agents Curing catalysts Viscosity (P) at 25° C. Viscosity (P) at 60° C. Pot life Heat-resistant temperature
   Table 2
   Table 3
   Table 4
   Table 5
   Table 6
   Table 7
   Table 8

Epoxy resins, curing agents and curing catalysts were mixed together at the mixing ratios shown in Tables 1 to 8, prior to sufficient dissolution under agitation and heating. Then, the viscosity increased, until the viscosity exceeded 5 P at 60° C. Therefore, the amounts of curing catalysts as described in the Tables were added to parts of the curing agents, prior to heating to 100 to 120° C. for agitation and dissolution, and the resulting mixtures were left to stand at room temperature. During dissolution under heating, parts of the curing agents were vaporized with a stimulating odor. Then, the remaining curing agents and epoxy resins were added to the mixtures for sufficient agitation. In all of the Examples, the viscosity was 5 P or less at 60° C. Mixing the curing catalysts in the amounts shown in the Tables with parts of the epoxy resins and heating the catalysts to 100 to 120° C. under agitation for dissolution, alternatively, the resulting mixtures were left at ambient temperature. Then, the remaining epoxy resins and the remaining curing agents were added to the mixtures for sufficient agitation. In all of the Examples, the viscosity was 5 P or less at 60° C. As the method for mixing the curing catalysts, preference is given to a method comprising dissolving the catalysts in the curing agents or the epoxy resins under heating and subsequently adding the remaining parts as shown in the Tables to the resulting mixtures. For environmental hygiene and for mixing the calculated amounts to be mixed, most preferably, the curing catalysts are dissolved in the epoxy resins under heating.

The viscosity at 25° C. and 60° C., the pot life and the heat-resistant temperature coefficient of a thermosetting resin composition are shown in the Tables, when a curing catalyst was dissolved in the epoxy resins. Herein, the viscosity was measured by a B-type viscometer; the pot life was defined as a period in a day until the initial viscosity of the thermosetting resin composition increased by two-fold. The heat-resistant temperature was determined according to the IEC Pub.216. More specifically, cured matters each of a size of 2×50×50 mm were left to stand in air-circulation type thermostats individually maintained at 270° C., 250° C. and 230° C., and thereafter, the samples were drawn out at a predetermined interval, to measure the weight to calculate the decrement due to heating. The time required for the decrement due to heating to reach 10% by weight was determined, which was defined as life. Plotting then the life vs. the inverse number of the absolute temperature, a linear relation was established in any case. Extrapolating the line, the temperature for the life to reach 20,000 hours was determined and defined as the heat-resistant temperature. The heat resistance of the thermosetting resin compositions for impregnating electric appliances is determined on the basis of the heat-resistant temperature.

Tables 1 to 3 indicate that the thermosetting resin compositions comprising
   (a) an epoxy resin with a naphthalene backbone, represented by the previously set forth Chemical formula 3, 4 or 5 or an epoxy resin with an anthracene backbone, such as diglycidyl ether of anthracene diol and triglycidyl ether of anthracene triol;
   (b) a bifunctional epoxy resin containing two p-(2,3-epoxypropoxy)phenyl groups;
   (c) an acid anhydride curing agent; and (d) a metal acetonate curing catalyst represented by the previously set forth Chemical formula 2 at 0.1 to 5 parts by weight per 100 parts by weight of the epoxy resins, wherein the ratio of the numbers of the epoxy resins used is 1 to 4, the ratio being represented by the following relationship:

Ratio of numbers of epoxy resins={[molar number of (b) used]×[number of epoxy resins in 1 mole of (b)]}÷{[molar number of (a) used]×[number of epoxy resins in 1 mole of (a)]}, are at a viscosity of 5 poise or more at 25° C. and a viscosity of 5 poise or less at 60° C. and have a heat-resistant temperature of 200° C. or more.

Table 3 indicates that when the ratio (b)/(a) as the ratio of the numbers of the epoxy resins used is 1 to 4 as represented by the following relationship, provided that (b) is a bifunctional epoxy resin containing two p-(2,3-eposypropoxy)phenyl groups and (a) is an epoxy resin with a naphthalene backbone or an epoxy resin with an anthracene backbone, such as diglycidyl ether of anthracene diol and triglycidyl ether of anthracene triol, represented by the previously set forth Chemical formula 3, 4 or 5;

Ratio of numbers of epoxy resins={[molar number of (b) used]×[number of epoxy resins in 1 mole of (b)]}÷{[molar number of (a) used]×[number of epoxy resins in 1 mole of (a)]}, the heat-resistant temperature is above 200° C. and the viscosity then is 5 poise or more at 25° C. and 5 poise or less at 60° C.; and when the ratio is 2 to 3, the heat-resistant temperature is larger, preferably. If the (b)/(a) ratio is 0.7, the heat-resistant temperature is small while the viscosity is too small, which causes a tendency for the resin flow out during impregnation and curing of coil. If the (b)/(a) ratio is 5.0, alternatively, the viscosity then is too high, which causes a tendency for the impregnation with the resin to hardly occur. It can be said that the ratio outside the range of 1 to 4 is not preferable.

Tables 4 to 7 indicate that manganese (III) acetylacetonate, manganese (III) benzoylacetonate, cobalt (II) acetylacetonate, cobalt (III) acetylacetonate, cobalt (II) benzoylacetonate, titanyl acetylacetonate, vanadium (III) acetylacetnaate, zirconium (IV) acetylacetnaate and the like are preferable as the curing catalyst.

Table 5 indicates that when a thermosetting resin composition comprises (b) a bifunctional epoxy resin containing two p-(2,3-epoxypropoxy)phenyl groups and (a) a polyfunctional epoxy resin containing three or more p-(2,3-epoxypropoxy)phenyl groups and a group represented by the previously set forth Chemical formula 1, provided that the (b)/(a) ratio as the ratio of the numbers of the epoxy resins used is 1 to 4, the ratio being represented by the following relationship:

Ratio of numbers of epoxy resins={[molar number of (b) used]×[number of epoxy resins in 1 mole of (b)]}÷{[molar number of (a) used]×[number of epoxy resins in 1 mole of (a)]}, the thermosetting resin composition has a heat-resistant temperature of 200° C. or more and is at a viscosity of 5 poise or more at 25° C. and 5 poise or less at 60° C. and that the heat-resistant temperature thereof is high within a range of 2 to 3 as the (b)/(a) ratio. If the (b)/(a) ratio is 0.6, the heat-resistant temperature is small while the viscosity is too small, which causes a tendency for the resin to flow out during impregnation and curing of coil. If the (b)/(a) ratio is 5.0, alternatively, the viscosity then is too high, which causes the tendency for the impregnation with the resin to be hardly effected. It can be said that the ratio outside the range of 1 to 4 is not preferable.

Table 6 indicates that the metal acetonate curing catalyst represented by the previously set forth Chemical formula 2 to be used in accordance with the present invention is contained at 0.1 to 5 parts by weight per 100 parts by weight of the epoxy resin. If the amount is too much, the pot life tends to be shortened; whereas, if the amount is too small, the curing performance is deteriorated, involving the tendency of the resin to flow.

Table 8 indicates that preference is given as the curing agent to methylhexahydrophthalic anhydride, methyltetrahydrophthalic anhydride, tetrahydrophthalic anhydride, and methylnadic anhydride; and that the acid anhydride should preferably be mixed with the epoxy resin at a ratio as an equivalent ratio of 0.8 to 1.2, from the aspect of heat resistance.

2. Preparation of insulating tape base material 1

A binder solution was prepared by adjusting the concentration of TEPPM by means of methyl ethyl ketone so that the non-volatile part of the solution might be at 50%. By using the binder solution, a calcined soft composite mica filled with an aromatic polyamide fibrid was attached to glass cloth, while the solvent was vaporized simultaneously. The binder contents in the resulting glass-reinforced mica tape (insulating tape base material) corresponded to the non-volatile parts, and therefore, three types of the insulating base material were thus prepared at the binder contents of about 5, 20 and 30% by weight (based on the total weight of the insulating tape base material). Cutting these types of the insulating tape base material, tapes of a 25-mm width were produced.

3. Preparation of insulating tape base material 2

A binder solution was prepared by adjusting the concentrations of POGEPN and alumina by means of methyl ethyl ketone so that the non-volatile parts thereof might be at 50%. By using the binder solution then, a calcined soft composite mica filled with an aromatic polyamide fibrid was attached to glass cloth, while the solvent was vaporized simultaneously. The binder contents in the resulting glass-reinforced mica tape (insulating tape base material) corresponded to the non-volatile parts, and therefore, three types of the insulating base material were thus prepared at the binder contents of about 5, 20 and 30% by weight (based on the total weight of the insulating tape base material). Cutting these types of the insulating tape base material, tapes of a 25-mm width and with a heat conductivity of 0.3 to 0.8 W/mK were produced.

4. Preparation of insulating tape base material 3

A binder solution was prepared by adjusting the concentrations of POGEPN and alumina by means of methyl ethyl ketone. By using the binder solution then, a calcined soft composite mica filled with an aromatic polyamide fibrid and alumina was attached to glass cloth, while the solvent was vaporized simultaneously. The binder contents in the resulting glass-reinforced mica tape (insulating tape base material) corresponded to the non-volatile parts, and therefore, three types of the insulating base material were thus prepared at the binder contents of about 5, 20 and 30% by weight (based on the total weight of the insulating tape base material). Cutting these types of the insulating tape base material, tapes of a 25-mm width and with a heat conductivity of 0.3 to 0.8 W/mK were produced.

5. Preparation of insulating tape base material 4

A binder solution was prepared by adjusting the concentrations of TEPPM and alumina by means of methyl ethyl ketone so that the non-volatile part of the solution might be at 50%. By using the binder solution then, a calcined soft composite mica filled with an aromatic polyamide fibrid was attached to glass cloth, while the solvent was vaporized simultaneously. The binder contents in the resulting glass-reinforced mica tape (insulating tape base material) corresponded to the non-volatile parts, and therefore, three types of the insulating base material were thus prepared at the binder contents of about 5, 20 and 30% by weight (based on the total weight of the insulating tape base material). Cutting these types of the insulating tape base material, tapes of a 25-mm width and with a heat conductivity of 0.3 to 0.8 W/mK were produced.

6. Preparation of insulating tape base material 5

A binder solution was prepared by adjusting the concentrations of TEPPM and alumina by means of methyl ethyl ketone so that the non-volatile part of the solution might be at 50%. By using the binder solution then, a calcined soft composite mica filled with an aromatic polyamide fibrid and alumina was attached to polyimide film, while the solvent was vaporized simultaneously. The binder contents in the resulting glass-reinforced mica tape (insulating tape base material) corresponded to the non-volatile parts, and therefore, three types of the insulating base material were thus prepared at the binder contents of about 5, 20 and 30% by weight (based on the total weight of the insulating tape base material). Cutting these types of the insulating tape base material, tapes of a 25-mm width and with heat conductivity of 0.3 to 0.8 W/mK were produced.

7. Production of electrically insulated coils

Winding the insulating tape base materials described above in the items 2 to 6 around stacks of insulated conductors, followed by in vacuo impregnation with thermosetting resin compositions as described above in the item 1 under pressure and subsequent heating at 100° C. for 10 hours, 150° C. for 3 hours and 230° C. for 10 hours, the compositions were cured. No peeling was observed on the insulating layers of the electrically insulated coils thus produced. Then, the water resistance and heat resistance were tested by the following methods. FIG. 1 is a perspective, partially cutout view of an electrically insulated coil of the type which was measured. Insulating layer 2, which is wound around and arranged on a stack of insulated conductors 1, is impregnated and cured with a thermosetting resin composition, and thus, these elements are integrated together.

a. Heat resistance test

One cycle of a heating and moisture absorption test at 270° C. for 24 hours and 40° C. for 24 hours in 95% RH was carried out for 10 cycles. At each cycle, the dissipation factor "tan δ" and insulation resistance were measured. In any of the Examples, the tan δ was 10% or less after the 10 cycles. Additionally, the insulation resistance was $10^{12}\Omega$ or more. In any of the Comparative Examples, alternatively, the tan δ after the 10 cycles was 20% or more. Additionally, the insulation resistance was $10^{10}\Omega$ or less.

b. Water resistance test

Along the tape winding direction on the insulating layer of an electrical insulating coil, a test piece of the insulating layer alone was cut out in a size of 10-mm width and 60-mm length. The bending strength thereof was measured at 25° C. under a load on the central part between two supported points at an interval of 40 mm. Similarly, the bending strength after 24-hr immersion of the test piece in water at 40° C. was measured to determine the strength retention rate. In any of the examples, the rate was 80% or more. In any of the Comparative examples, the rate was 60% or less.

c. Electric performance test

Figure 2:
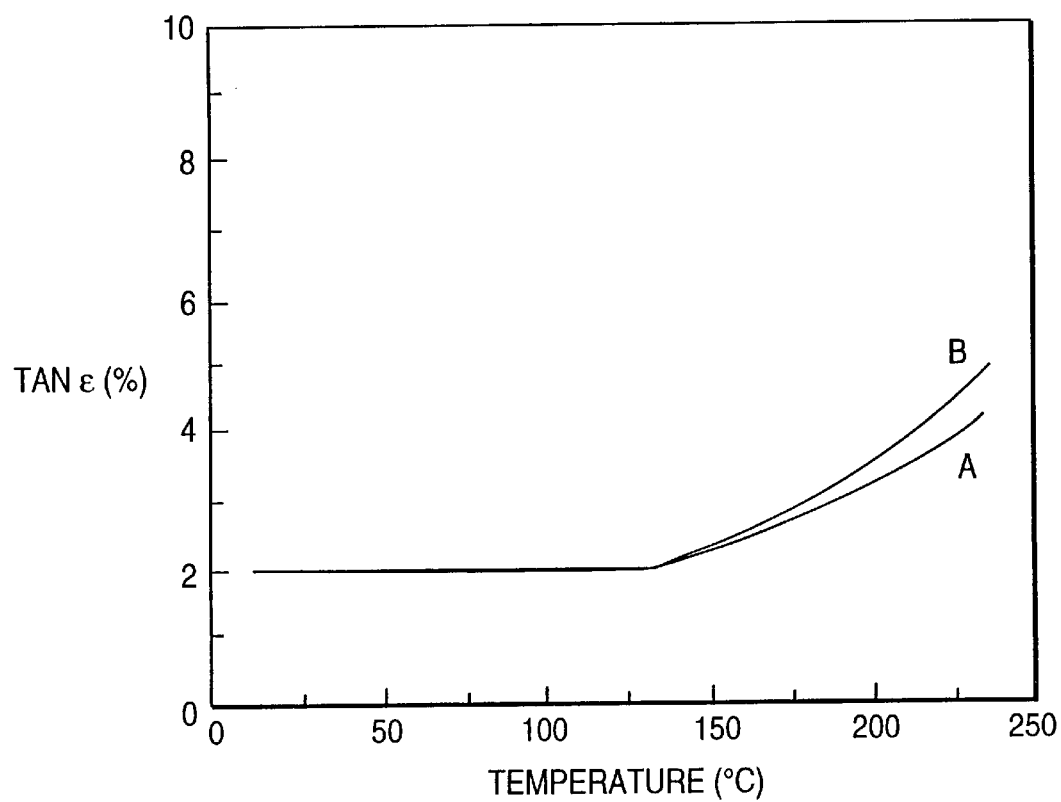
FIG. 2 is a graph depicting the temperature characteristics of the dielectric tangent of an electrically insulated coil forming one example of the present invention.

The temperature characteristics of the Dissipation factor "tan δ" of the electrical insulating coil produced in Example 1 are shown as the relation between the temperature (°C; on the axis of abscissa) and the tan δ (%; on the axis of ordinate) in the graph shown in FIG. 2. In FIG. 2, "A" represents the characteristic curve at an initial insulation stage; and "B" represents the characteristic curve after 1000-hr heating at 250° C. in the Example 1.

Figure 3:
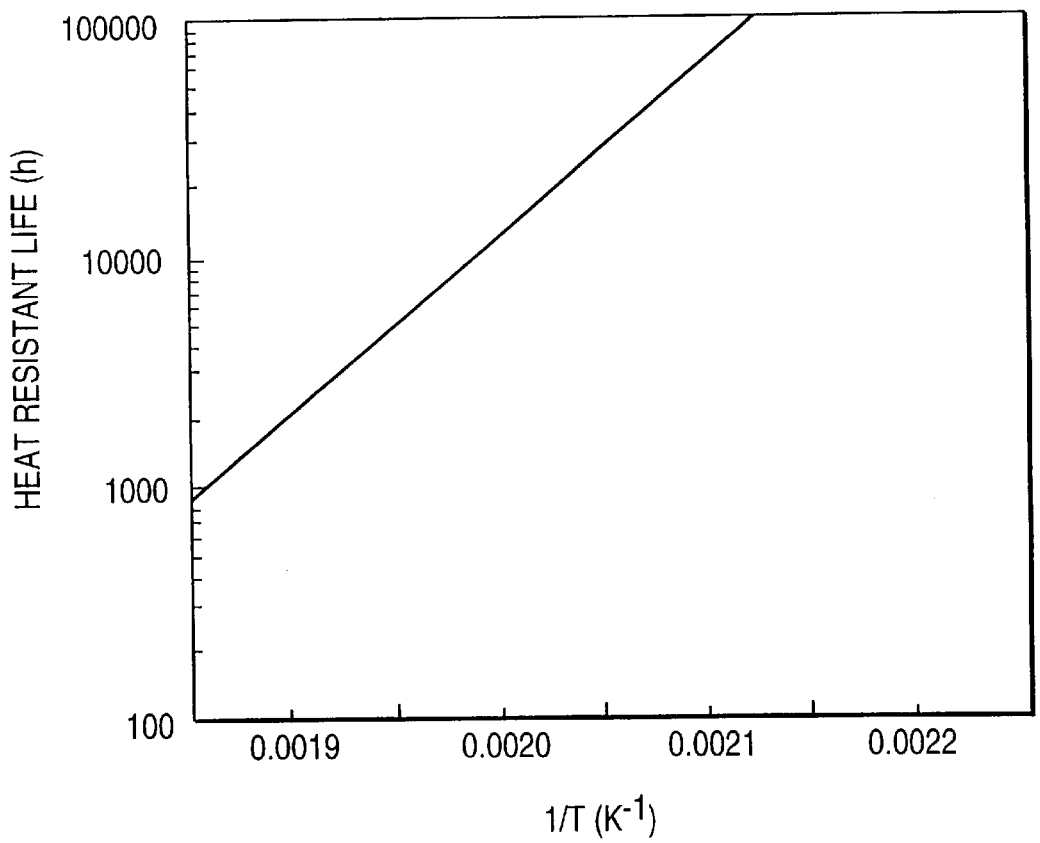
FIG. 3 is a graph depicting the heat-resistant life of an electrically insulated coil forming one example of the present invention.

Furthermore, FIG. 3 is a thermal endurance graph depicting the relation between the heat-resistant life (h; on the axis of ordinate) of an electrical insulating coil of the present invention and temperature (°C; on the axis of abscissa).

As shown in FIG. 3, the coil of the present invention is highly heat resistant in the heat-resistant life at a motorette test according to U.S. Standard IEEE. NO. 275, and it is indicated that the coil is usable at 200° C. or more.

In Examples 2 to 56, the coils of the present invention are highly heat resistant in the heat-resistant life at a motorette test according to U.S. Standard IEEE. No. 27s, and it is indicated that the coils are usable at 200° C. or more.

A tape with a higher heat conductivity, if used as the insulating tape base material, can have better thermal dispersion, which enables the production of a small-scale and light-weight rotating machine at a low cost. Particularly, a heat conductivity of 0.3 to 0.8 W/mK is effective In contrast, electrically insulated coils produced by using thermosetting resin compositions of the Comparative Examples showed a poor voltage profile as a dissipation factor with a larger corona discharge, so that the heat-resistant life was at 190° C. or less as determined by the motorett test.

8. Production of stators of rotating machine

Incorporating each of the electrically insulated coils described in the item 7, together with a slot liner, into the slot of an iron core and inserting a wedge on the external circumferential groove of the iron core, a stator of a rotating machine was produced.

In any of the Examples, the impregnation of the insulating layers of the electrically insulated coils with the cured matters of the thermosetting resin compositions was sufficiently effected, with no peeling being observed. In any of the Comparative Examples, alternatively, cured products of the thermosetting resin compositions were almost not filled in between the electrically insulated coils and the iron core slots, resulting in a poor voltage profile as a dissipation factor and a larger corona discharge.

EXAMPLE 57

Production of the stators of the rotating machine

Figure 4:
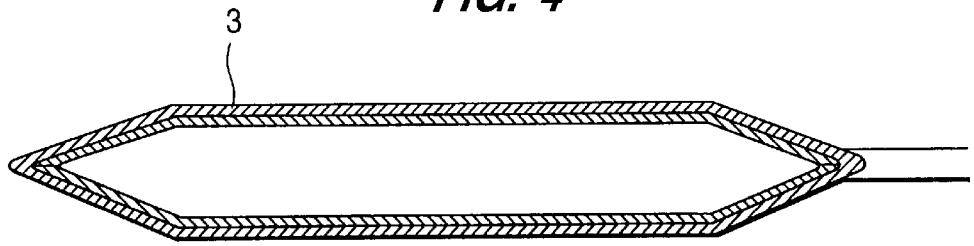
FIG. 4 is a cross-section of the coil (stack of insulated layers) of the present invention.
Figure 5:
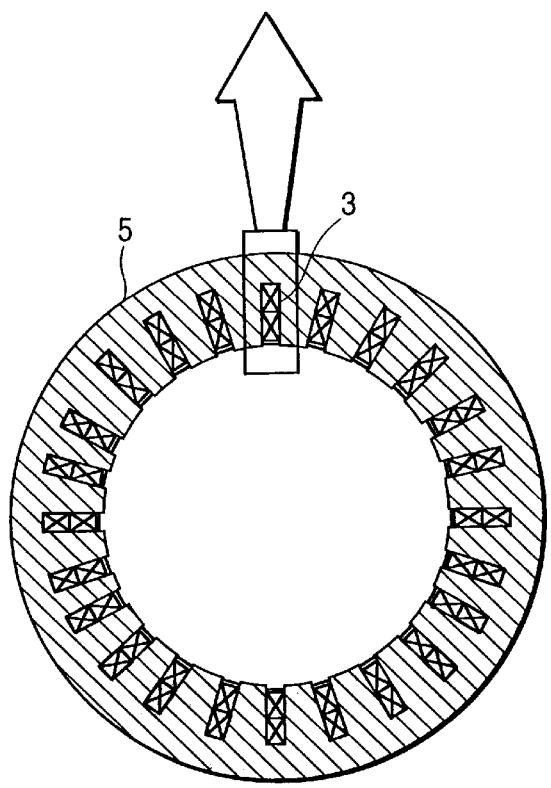
FIG. 5 is a transverse the cross section of the rotating electric stator of the present invention.
Figure 6:
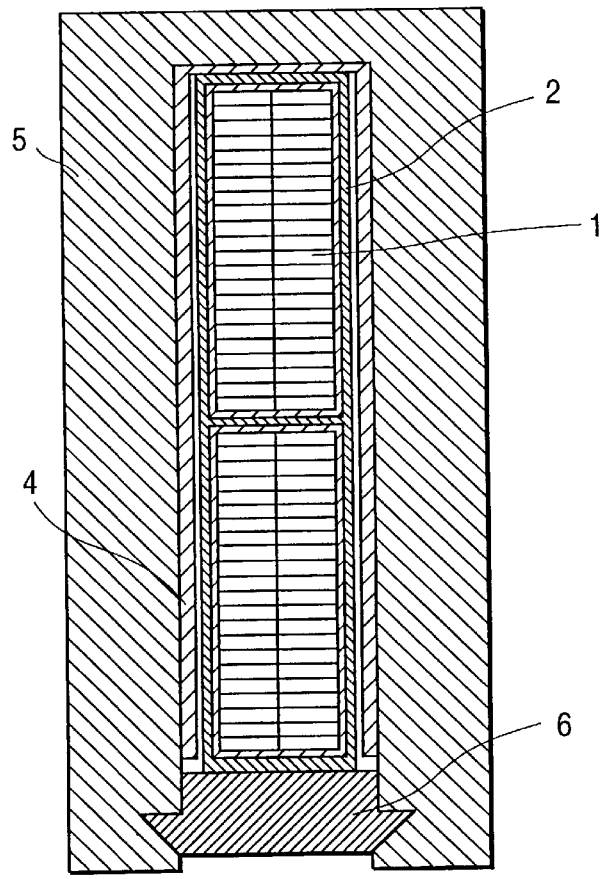
FIG. 6 is an enlarged radial cross section of the rotating electric stator of FIG. 5.

Winding each of the insulating tape base materials described in the item 2 around a stack of insulated conductors formed into a defined coil shape, coil 3 as shown in FIG. 4 was prepared. As shown in FIG. 5, the coil 3 was incorporated together with a slot liner 4 into the slot of an iron core 5, followed by insertion of a wedge 6 on the external circumferential groove of the iron core slot. Subsequently connecting the electrical insulating coil at the external end part of the iron core and impregnating in vacuo the electrically insulated coils and the iron core slots together at their integrated state with a thermosetting resin composition in Tables 1 to 8, prior to heating at 175° C. for 4 hours, a stator of rotating machine was produced.

In any of the Examples, the impregnation of the insulating layers of the electrically insulated coils with the cured products of the thermosetting resin compositions was sufficiently effected, with no peeling observed. The cured products of the thermosetting resin compositions were also completely filled in between the electrical insulating coils and the iron core slots. In any of the Comparative Examples, alternatively, almost all cured products of the thermosetting resin compositions were not filled in between the electrically insulated coils and the iron core slots, resulting in a poor voltage profile as a dielectric tangent and a larger corona discharge.

EXAMPLE 58

Production of stators of rotating machines.

Winding each of the insulating tape base materials described in the item 3, 4, 5 or 6 around a stack of insulated conductors formed into a defined coil shape, coil 3 as shown in FIG. 4 was prepared. As shown in FIG. 5, the coil 3 was incorporated together with a highly heat-conductive, semi-conductive slot liner 4 with a heat conductivity of 0.3 to 1.0 W/mK and surface resistance of 0.2 to 100 kΩ into the slot of iron core 5, followed by insertion of wedge 6 on the external circumferential groove of the iron core slot.

Subsequently connecting the electrical insulating coil at the external end part of the iron core and impregnating in vacuo the electrically insulated coils and the iron core slots together at their integrated state with a thermosetting resin composition in Tables 1 to 8, prior to heating at 175° C. for 4 hours, a stator of rotating machine was produced.

In any of the Examples, the impregnation of the insulating layers of the electrically insulated coils with he cured matters of the thermosetting resin compositions was sufficiently effected, with no peeling observed. The cured matters of the thermosetting resin compositions were completely filled in between the electrically insulated coils and the iron core slots. In any of the Comparative Examples, alternatively, almost all cured matters of the thermosetting resin compositions were not filled in between the electrical insulating coils and the iron core slots, resulting in a poor voltage profile as a dielectric tangent and a larger corona discharge.

It is indicated that the stators of a rotating machine wound with an insulating tape base material with a heat conductivity as high as 0.3 to 0.8 W/mK has a greater thermal dispersion performance than the stators of a rotating machine wound with an insulating tape base material with a heat conductivity of 0.2 W/mK or less; if these stators are of the same size, the stator wound with the material with a heat conductivity of 0.3 to 0.8 W/mK can pass a larger power and a higher electric current; at the same power level, the equipment therefor can be made small and light in weight, resulting in a cost reduction.

EXAMPLE 59

Production of the stators of a rotating machine

Winding each of the insulating tape base materials described in the items 2 to 6 around a stack of insulated conductors formed into a defined coil shape, coil 3 as shown in FIG. 4 was prepared. As shown in FIG. 5, the coil 3 was incorporated together with a highly heat-conductive, semi-conductive slot liner 4 with a heat conductivity of 0.3 to 1.0 W/mK and a surface resistance of 0.2 to 100 kΩ into the slot of iron core 5, followed by insertion of wedge 6 on the external circumferential groove of the iron core slot. Subsequently connecting the electrically insulated coil at the external end part of the iron core and impregnating in vacuo the electrically insulated coils and the iron core slots together at their integrated state with a thermosetting resin composition in Tables 1 to 8, prior to heating at 175° C. for 4 hours, a stator of roating machine was produced.

In any of the Examples, the impregnation of the insulating layers of the electrically insulated coils with the cured matters of the thermosetting resin compositions was sufficiently effected, with no peeling being observed. The cured matters of the thermosetting resin compositions were completely filled in between the electrical insulating coils and the iron core slots. In any of the Comparative Examples, alternatively, almost all cured matters of the thermosetting resin compositions were not filled in between the electrical insulating coils and the iron core slots, resulting in a poor voltage profile as a dielectric tangent and a larger corona discharge.

It is indicated that a stator of a rotating machine using a highly heat-conductive, semi electrically conductive slot liner with a heat conductivity as high as 0.3 to 0.8 W/mK and with a surface resistance of 0.2 to 100 kΩ has a higher thermal dispersion performance than a stator of a rotating machine wound with an insulating tape base material with a heat conductivity of 0.2 W/mK or less; if these stators are of the same size, the stator using a highly heat-conductive, semi electrically conductive slot liner with a heat conductivity as high as 0.3 to 0.8 W/mK and with a surface resistance of 0.2 to 100 kΩ can pass a larger power and a higher electric current; at the same power level, the equipment can be made small and light in weight, with a cost reduction. It is indicated also that a stator of a rotating machine using a highly heat-conductive, semiconductive slot liner with a heat conductivity as high as 0.3 to 1.0 W/mK and a surface resistance of 0.1 to 100 kΩ and using an insulating tape base material with a high heat conductivity of 0.3 to 0.8 W/mK has the highest thermal dispersion performance; at the same size, the stator can pass a larger power and a higher electric current; and, at the same power level, the equipment can be made small and light in weight, with cost reduction.

Production of a revolving armatures

EXAMPLE 60

Production of rotating machine

Figure 7:
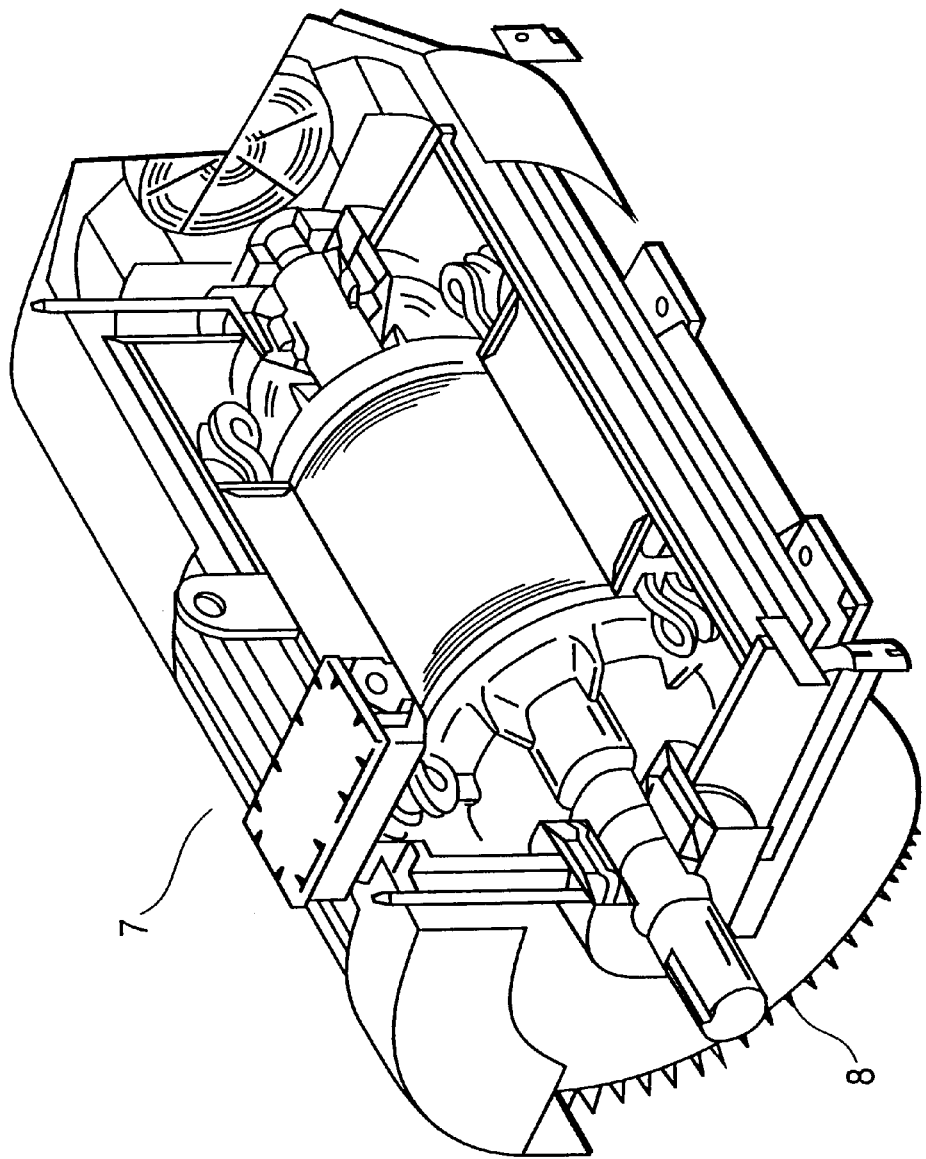
FIG. 7 is a perspective view depicting a rotating machine forming one example of the present invention.

As shown in FIG. 7, an electric motor was prepared from a combination of a stator 7 as produced in Example 57 to 59 with an armature coil 8.

The stator using a highly heat-conductive, semi electrically conductive slot liner with a heat conductivity of 0.3 to 1.0 W/mK and with a surface resistance of 0.2 to 100 kΩ and using a highly heat-conductive insulating tape base material with a heat conductivity of 0.3 to 0.8 W/mK has an improved thermal dispersion performance by 20% or more, compared with other rotating machines, with a resultant small machine size represented by a 25% or more reduction in size and a weight reduction of 23% or more. Thus, less materials are required, whereby the cost can be reduced distinctively, and additionally, only a smaller equipment space is needed.

As apparent from the above description, in accordance with the present invention, the following advantages are realized: a high heat-resistant electrically insulated coil with less flow of a thermosetting resin composition can be produced, when as the thermosetting resin composition, for impregnating the electrical insulating coil to be used at single impregnation process or total impregnation process, is made of a thermosetting resin composition having a viscosity of 5 poise or more, preferably 10 poise or more at 25° C., and a viscosity of 5 poise or less at 60° C., comprising (a) a polyfunctional epoxy resin containing three or more p-(2,3-epoxypropoxy)phenyl groups and a group represented by the previously set forth Chemical formula 1; or an epoxy resin with a naphthalene backbone represented by the previously set forth Chemical formula 3, 4 or 5 or an epoxy resin with an anthracene backbone, such as diglycidyl ether of anthracene diol and triglycidyl ether of anthracene triol;

(b) a bifunctional epoxy resin containing two p-(2,3-epoxypropoxy)phenyl groups;

(c) an acid anhydride curing agent; and (d) a metal acetonate curing catalyst represented by the previously set forth Chemical formula 2 at 0.1 to 5 parts by weight per 100 parts by weight of the epoxy resins, wherein the ratio of the numbers of the epoxy resins used is 1 to 4, the ratio being represented by the following relationship:

Ratio of numbers of epoxy resins={[molar number of (b) used]×[number of epoxy resins in 1 mole of (b)]}÷{[number of (a) used]×[number of epoxy resins in 1 mole of (a)]}. By selecting a total impregnation process by using a highly heat-conductive insulating tape base material with a heat conductivity of 0.3 to 0.8 W/mK and using a highly heat-conductive, semi electrically conductive slot liner with a heat conductivity of 0.3 to 1.0 W/mK and with a surface resistance of 0.2 to 100 kΩ, a higher thermal dispersion performance can be attained; at the same size, such a revolving armature can pass a larger power and higher electric current; and, at the same power, a rotating machine with a smaller machine size and a light weight can be produced at low cost.

What is claimed is:

1. A stator of rotating machine, produced by a method comprising the steps of: incorporating into an iron core slot an electrically insulating coil produced by winding an insulating tape base material around a conductor formed into a defined coil shape, inserting a wedge into an external circumferential groove of the iron core slot to connect the electrical insulating coil to an external end part of the iron core, and thereafter impregnating and curing the electrically insulated coil and the iron core slot in their integrated state with a thermosetting resin composition, wherein as the thermosetting resin composition, use is made of a thermosetting resin composition being at a viscosity of 5 poise or more at 25° C. and a viscosity of 5 poise or less at 60° C. and comprising:

(a) a polyfunctional epoxy resin containing three or more p-(2,3-epoxypropoxy) phenyl groups and a group represented by the Chemical formula 1 as follows:

Chemical Formula 1

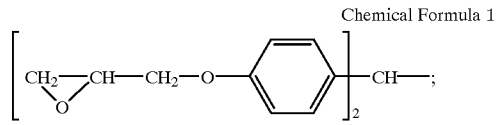

or an epoxy resin with a naphthalene backbone, represented by the Chemical formula 3, 4 or 5 as follows:

Chemical Formula 3

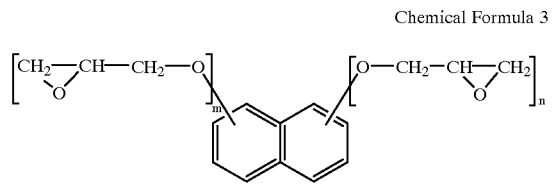

(wherein "n" and "m" are 1, 2 or 3);

Chemical Formula 4

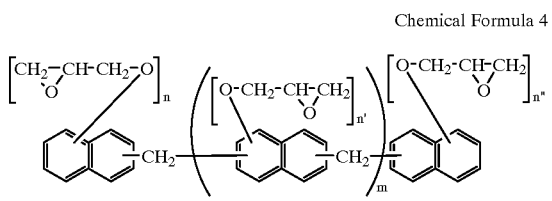

(wherein "m" is 0, 1 or 2; "n", "n'" and "n''" are 1, 2, 3 or 4; and the groups with "n", "n'" and "n''" may be attached independently to either one ring or both rings of each of the naphthalene rings); and Chemical Formula 5

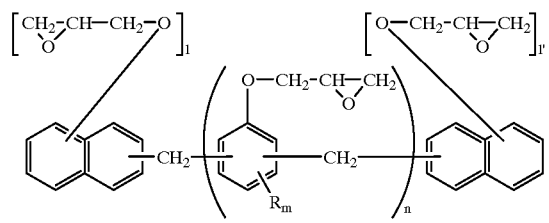

(wherein R is an alkyl group with 1 to 10 carbon atoms; "m" is 0, 1 or 2; "n" is 1, 2 or 3; "l" and "l'" are 1, 2, 3 or 4; and the groups with "n", "l" and "l'" may be attached independently to either one ring or both rings of each of the naphthalene rings), or an epoxy resin with an anthracene backbone;

(b) a bifunctional epoxy resin containing two p-(2,3-epoxypropoxy) phenyl groups;

(c) an acid anhydride curing agent; and (d) a metal acetonate curing catalyst represented by the Chemical formula 2 as follows:

Chemical Formula 2

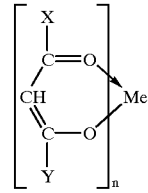

(wherein X and Y represent methyl group or phenyl group: Me represents Mn. Co, Zn or Zr; and "n" represents the coordination number at 0.1 to 5 parts by weight per 100 parts by weight of the epoxy resins; wherein the ratio of the number of the epoxy resins used is 1 to 4, the ratio being represented by the following relationship:

Ratio of number of epoxy resins={(molar number of (b) used)×(number of epoxy resins in 1 mole of (b))}÷{(molar number of (a) used)×(number of epoxy resins in 1 mole of (a))}.

2. The stator according to claim 1, wherein the epoxy resin with an anthracene backbone is selected from the group consisting of diglycidyl ether of anthracene diol and triglycidyl ether of anthracene triol.

3. A stator of rotating machine, produced by a method comprising the steps of: incorporating into an iron core slot an electrical insulating coil produced by winding an insulating tape base material around a conductor formed into a defined coil shape, inserting a wedge into an external circumferential groove of the iron core slot to connect the electrical insulating coil to an external end part of the iron core, and thereafter impregnating and curing the electrical insulating coil and the iron core slot in their integrated state with a thermosetting resin composition, wherein as the insulating tape base material, use is made of an insulating tape base material with a heat conductivity as high as 0.3 to 0.8 W/mK and wherein as the thermosetting resin composition, use is made of a thermosetting resin composition being at a viscosity of 5 poise or more at 25° C. and a viscosity of 5 poise or less at 60° C. and comprising:

(a) a polyfunctional epoxy resin containing three or more p-(2,3-epoxypropoxy) phenyl groups and a group represented by the Chemical formula 1 as follows:

Chemical Formula 1

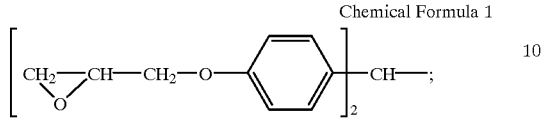

or an epoxy resin with a naphthalene backbone triol, represented by the Chemical formula 3, 4 or 5 as follows:

Chemical Formula 3

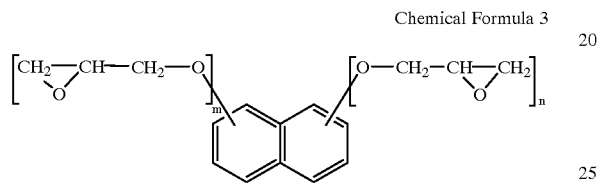

(wherein "n" and "m" are 1, 2 or 3);

Chemical Formula 4

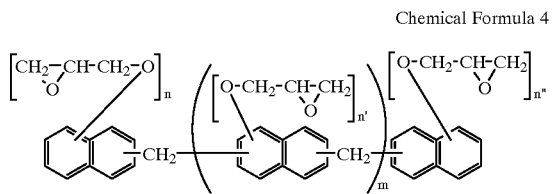

(wherein "m" is 0, 1 or 2; "n", "n'" and "n''" are 1, 2, 3 or 4; and the groups with "n", "n'" and "n''" may be attached independently to either one ring or both rings of each of the naphthalene rings); and Chemical Formula 5

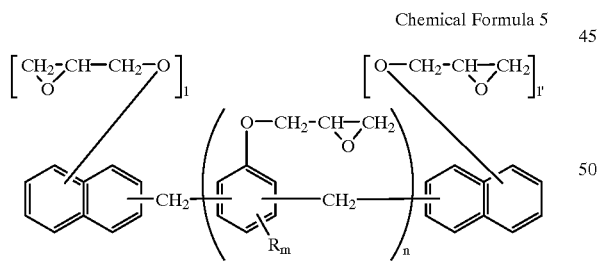

(wherein R is an alkyl group with 1 to 10 carbon atoms; "m" is 0.1 or 2; "n" is 1, 2 or 3; "l" and "l'" are 1, 2, 3 or 4; and the groups with "n", "l" and "l'" may be attached independently to either one ring or both rings of each of the naphthalene rings, or an epoxy resin with an anthracene backbone;

(b) a bifunctional epoxy resin containing two p-(2,3-epoxypropoxy) phenyl groups;

(c) an acid anhydride curing agent; and (d) a metal acetonate curing catalyst represented by the Chemical formula 2 as follows:

Chemical Formula 2

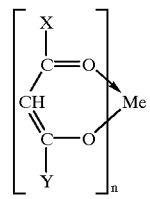

(wherein X and Y represent methyl group or phenyl group; Me represents Mn, Co, Zn or Zr; and "n" represents the coordination number) at 0.1 to 5 parts by weight per 100 parts by weight of the epoxy resins;

wherein the ratio of the number of the epoxy resins used is 1 to 4, the ratio being represented by the following relationship:

Ratio of number of epoxy resins={(molar number of (b) used)×(number of epoxy resins in 1 mole of (b))}÷{(molar number of (a) used)×(number of epoxy resins in 1 mole of (a))}.

4. The stator according to claim 3, wherein the epoxy resin with an anthracene backbone is selected from the group consisting of diglycidyl ether of anthracene diol and triglycidyl ether of anthracene triol.

5. A stator of rotating machine, produced by a method comprising the steps of: incorporating, into an iron core slot, an electrical insulating coil produced by winding an insulating tape base material around a stack of insulated conductors formed into a defined coil shape together with a semi-electrically conductive slot liner, inserting a wedge into an external circumferential groove of the iron core slot to connect the electrically insulated coil to an external end part of the iron core, and thereafter impregnating and curing the electrically insulated coil and the iron core slot in their integrated state with a thermosetting resin composition;

wherein as the semi electrical conductive slot liner, use is made of a highly heat-conductive, semiconductive slot liner with a heat conductivity as high as 0.3 to 1.0 W/mK and surface resistance of 0.2 to 100 kΩ; and wherein as the thermosetting resin composition, use is made of a thermosetting resin composition being at a viscosity of 5 poise or more at 25° C. and a viscosity of 5 poise or less at 60° C. and comprising:

(a) a polyfunctional epoxy resin containing three or more p-(2,3-epoxypropoxy) phenyl groups and a group represented by the Chemical formula 1 as follows:

Chemical Formula 1

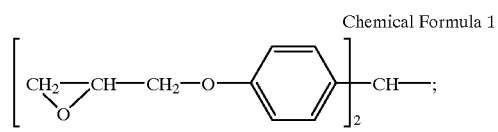

or an epoxy resin with a naphthalene backbone, represented by the Chemical formula 3, 4 or 5 as follows:

Chemical Formula 3

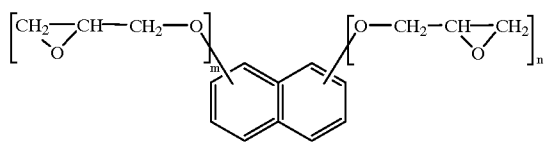

(wherein "n" and "m" are 1, 2 or 3);

Chemical Formula 4

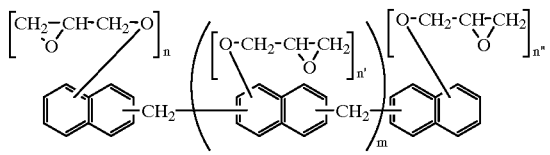

(wherein "m" is 0, 1 or 2; "n", "n'" and "n''" are 1, 2, 3 or 4; and the groups with "n", "n'" and "n''" may be attached independently to either one ring or both rings of each of the naphthalene rings); and Chemical Formula 5

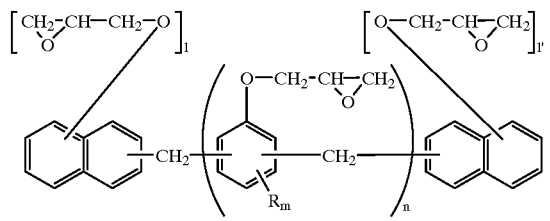

(wherein R is an alkyl group with 1 to 10 carbon atoms; "m" is 0, 1 or 2; "n" is 1, 2 or 3; "l" and "l'" are 1, 2, 3 or 4; and the groups with "n", "l" and "l'" may be attached independently to either one ring or both rings of each of the naphthalene rings), or an epoxy resin with an anthracene backbone;

(b) a bifunctional epoxy resin containing two p-(2,3-epoxypropoxy) phenyl groups;

(c) an acid anhydride curing agent; and (d) a metal acetonate curing catalyst represented by the Chemical formula 2 as follows:

Chemical Formula 2

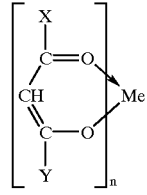

(wherein X and Y represent methyl group or phenyl group; Me represents Mn, Co, Zn or Zr; and "n" represents the coordination number) at 0.1 to 5 parts by weight per 100 parts by weight of the epoxy resins;

wherein the ratio of the number of the epoxy resins used is 1 to 4, the ratio being represented by the following relationship:

Ratio of number of epoxy resins={(molar number of (b) used)×(number of epoxy resins in 1 mole of (b))}÷{(molar number of (a) used)×(number of epoxy resins in 1 mole of (a))}.

6. The stator according to claim 5, wherein the epoxy resin with an anthracene backbone is selected from the group consisting of diglycidyl ether of anthracene diol and triglycidyl ether of anthracene triol.

7. A stator of rotating machine, produced by a method comprising the steps of: incorporating, into an iron core slot, an electrically insulated coil produced by winding an insulating tape base material around a stack of insulated conductors formed into a defined coil shape together with a semi-electrically conductive slot liner, inserting a wedge into an external circumferentially groove of the iron core slot to connect the electrically insulated coil to an external end part of the iron core, and thereafter impregnating and curing the electrical insulating coil and the iron core slot in their integrated state with a thermosetting resin composition;

wherein as the insulating tape base material, use is made of an insulating tape base material with a heat conductivity as high as 0.3 to 0.8 W/mK;

wherein as the semi electrical conductive slot liner, use is made of a highly heat-conductive, semi-electrically conductive slot liner with a heat conductivity as high as 0.3 to 1.0 W/mK and surface resistance of 0.2 to 100 kΩ; and wherein as the thermosetting resin composition, use is made of a thermosetting resin composition being at a viscosity of 5 poise or more at 25° C. and a viscosity of 5 poise or less at 60° C. and comprising:

(a) a polyfunctional epoxy resin containing three or more p-(2,3-epoxypropoxy) phenyl groups and a group represented by the Chemical formula 1 as follows:

Chemical Formula 1

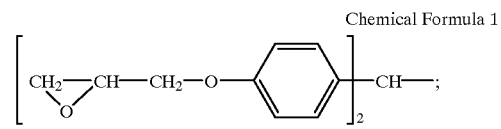

or an epoxy resin with a naphthalene backbone, represented by the Chemical formula 3, 4 or 5 as follows:

Chemical Formula 3

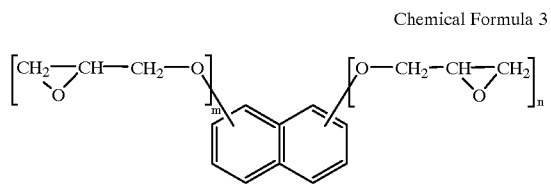

(wherein "n" and "m" are 1, 2 or 3);

Chemical Formula 4

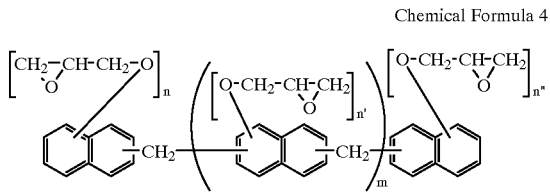

(wherein "m" is 0, 1 or 2; "n", "n'" and "n''" are 1, 2, 3 or 4; and the groups with "n", "n'" and "n''" may be attached independently to either one ring or both rings of each of the naphthalene rings); and Chemical Formula 5

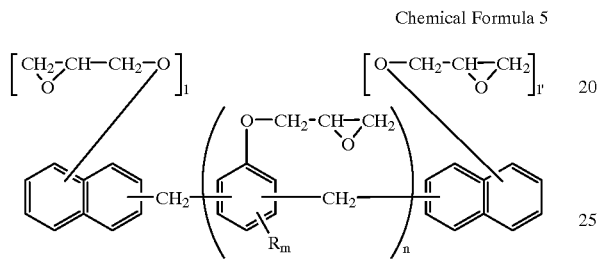

(wherein R is an alkyl group with 1 to 10 carbon atoms; "m" is 0, 1 or 2; "n" is 1, 2 or 3; "l" and "l'" are 1, 2, 3 or 4; and the groups with "n", "l" and "l'" may be attached independently to either one ring or both rings of each of the naphthalene rings), or an epoxy resin with an anthracene backbone;

(b) a bifunctional epoxy resin containing two p-(2,3-epoxypropoxy) phenyl groups;

(c) an acid anhydride curing agent; and (d) a metal acetonate curing catalyst represented by the Chemical formula 2 as follows:

Chemical Formula 2

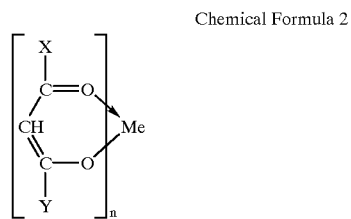

(wherein X and Y represent methyl group or phenyl group; Me represents Mn, Co, Zn or Zr; and "n" represents the coordination number) at 0.1 to 5 parts by weight per 100 parts by weight of the epoxy resins; wherein the ratio of the number of the epoxy resins used is 1 to 4, the ratio being represented by the following relationship:

Ratio of number of epoxy resins={(molar number of (b) used)×(number of epoxy resins in 1 mole of (b))}÷{(molar number of (a) used)×(number of epoxy resins in 1 mole of (a))}.

8. The stator according to claim 7, wherein the epoxy resin with an anthracene backbone is selected from the group consisting of diglycidyl ether of anthracene diol and triglycidyl ether of anthracene triol.

9. A rotating machine comprising a stator and a rotor, produced by a method comprising the steps of: incorporating into an iron core slot an electrically insulated coil produced by winding an insulating tape base material around a stack of insulated conductors formed into a defined coil shape, inserting a wedge into an external circumferential groove of the iron core slot to connect the electrical insulating coil to an external end part of the iron core, and thereafter impregnating and curing the electrically insulated coil and the iron core slot in their integrated state with a thermosetting resin composition, wherein as the thermosetting resin composition, use is made of a thermosetting resin composition being at a viscosity of 5 poise or more at 25° C. and a viscosity of 5 poise or less at 60° C. and comprising:

(a) a polyfunctional epoxy resin containing three or more p-(2,3-epoxypropoxy) phenyl groups and a group represented by the Chemical formula 1 as follows:

Chemical Formula 1

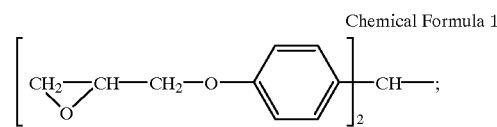

or an epoxy resin with a naphthalene backbone, represented by the Chemical formula 3, 4 or 5 as follows:

Chemical Formula 3

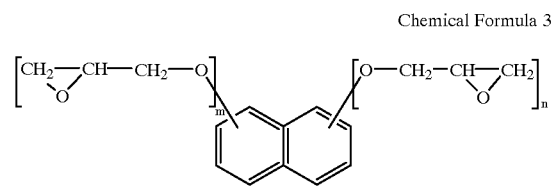

(wherein "n" and "m" are 1, 2 or 3);

Chemical Formula 4

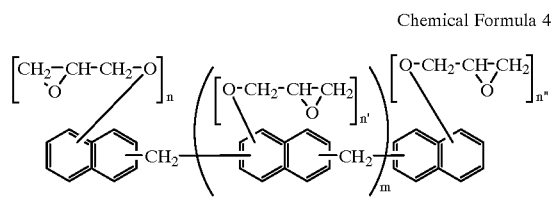

(wherein "m" is 0, 1 or 2; "n", "n'" and "n''" are 1, 2, 3 or 4; and the groups with "n", "n'" and "n''" may be attached independently to either one ring or both rings of each of the naphthalene rings); and Chemical Formula 5

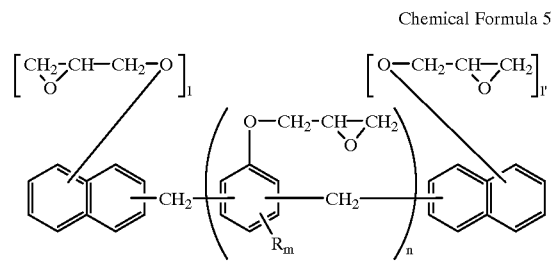

(wherein R is an alkyl group with 1 to 10 carbon atoms; "m" is 0, 1 or 2; "n" is 1, 2 or 3; "l" and "l'" are 1, 2, 3 or 4; and the groups with "n", "l" and "l'" may be attached independently to either one ring or both rings of each of the naphthalene rings), or an epoxy resin with an anthracene backbone;

(b) a bifunctional epoxy resin containing two p-(2,3-epoxypropoxy) phenyl groups;

(c) an acid anhydride curing agent; and (d) a metal acetonate curing catalyst represented by the Chemical formula 2 as follows:

Chemical Formula 2

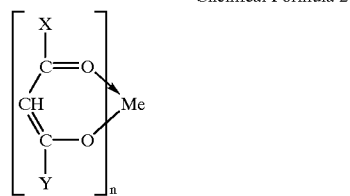

(wherein X and Y represent methyl group of phenyl group; Me represents Mn, Co, Zn or Zr; and "n" represents the coordination number) at 0.1 to 5 parts by weight per 100 parts by weight of the epoxy resins;

wherein the ratio of the number of the epoxy resins used is 1 to 4, the ratio being represented by the following relationship:

Ratio of number of epoxy resins={(molar number of (b) used)×(number of epoxy resins in 1 mole of (b))}÷{(molar number of (a) used)×(number of epoxy resins in 1 mole of (a))}.

10. The rotating machine according to claim 9, wherein the epoxy resin with an anthracene backbone is selected from the group consisting of diglycidyl ether of anthracene diol and triglycidyl ether of anthracene triol.

11. A stator of rotating machine, produced by a method comprising the steps of: incorporating into an iron core slot an electrically insulated coil produced by winding an insulating tape base material around a stack of insulated conductors formed into a defined coil shape together with a semi-electrically conductive slot liner, inserting a wedge into an external circumferential groove of the iron core slot to connect the electrically insulated coil to the external end part of the iron core, and thereafter impregnating and curing the electrically insulated coil and the iron core slot in their integrated state with a thermosetting resin composition, wherein as the insulating tape base material, use is made of a corona-resistant polyimide film;

wherein as the semi electrical conductive slot liner, use is made of a highly heat-conductive, semi-electrically conductive slot liner with a heat conductivity as high as 0.3 to 1.0 W/mK and a surface resistance of 0.2 to 100 kΩ; and wherein as the thermosetting resin composition, use is made of a thermosetting resin composition being at a viscosity of 5 poise or more at 25° C. and a viscosity of 5 poise or less at 60° C. and comprising:

(a) a polyfunctional epoxy resin containing three or more p-(2,3-epoxypropoxy) phenyl groups and a group represented by the Chemical formula 1 as follows:

Chemical Formula 1

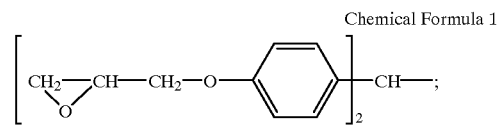

or an epoxy resin with a naphthalene backbone, represented by the Chemical formula 3, 4 or 5 as follows:

Chemical Formula 3

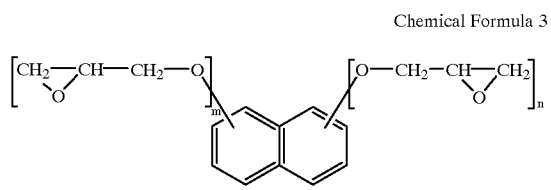

(wherein "n" and "m" are 1, 2 or 3);

Chemical Formula 4

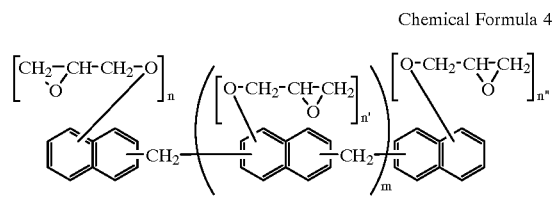

(wherein "m" is 0, 1 or 2; "n", "n'" and "n''" are 1, 2, 3 or 4; and the groups with "n", "n'" and "n''" may be attached independently to either one ring or both rings of each of the naphthalene rings); and Chemical Formula 5

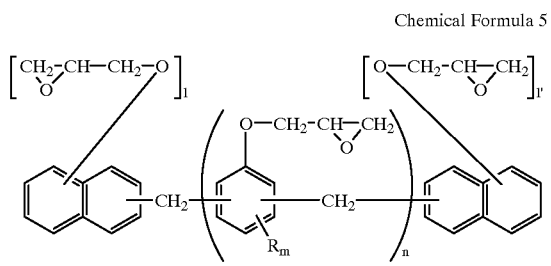

(wherein R is an alkyl group with 1 to 10 carbon atoms; "m" is 0, 1 or 2; "n" is 1, 2 or 3; "l" and "l'" are 1, 2, 3 or 4; and the groups with "n", "l" and "l'" may be attached independently to either one ring or both rings of each of the naphthalene rings), or an epoxy resin with an anthracene backbone;

(b) a bifunctional epoxy resin containing two p-(2,3-epoxypropoxy) phenyl groups;

(c) an acid anhydride curing agent; and (d) a metal acetonate curing catalyst represented by the Chemical formula 2 as follows:

Chemical Formula 2

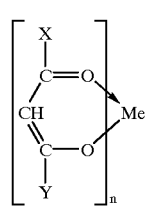

(wherein X and Y represent methyl group or phenyl group; Me represents Mn, Co, Zn or Zr; and "n" represents the coordination number) at 0.1 to 5 parts by weight per 100 parts by weight of the epoxy resins;

wherein the ratio of the number of the epoxy resins used is 1 to 4, the ratio being represented by the following relationship:

Ratio of number of epoxy resins={(molar number of (b) used)×(number of epoxy resins in 1 mole of (b))}÷{(molar number of (a) used)×(number of epoxy resins in 1 mole of (a))}.

12. The stator according to claim 11, wherein the epoxy resin with an anthracene backbone is selected from the group consisting of diglycidyl ether of anthracene diol and triglycidyl ether of anthracene triol.

13. A rotor of rotating machine, produced by a method comprising the steps of: impregnating and curing an electrically insulated coil produced by winding an insulating tape base material around a stack of insulated conductors formed into a defined coil shape with a thermosetting resin composition, wherein as the insulating tape base material, use is made of a corona-resistant polyimide film, and wherein as the thermosetting resin composition, use is made of a thermosetting resin composition being at a viscosity of 5 poise or more at 25° C. and a viscosity of 5 poise or less at 60° C. and comprising:

(a) a polyfunctional epoxy resin containing three or more p-(2,3-epoxypropoxy) phenyl groups and a group represented by the Chemical formula 1 as follows:

Chemical Formula 1

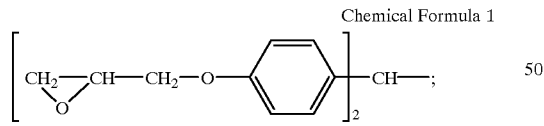

or an epoxy resin with a naphthalene backbone triol, represented by the Chemical formula 3, 4 or 5 as follows:

Chemical Formula 3

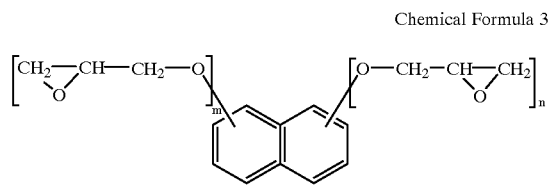

(wherein "n" and "m" are 1, 2 or 3);

Chemical Formula 4

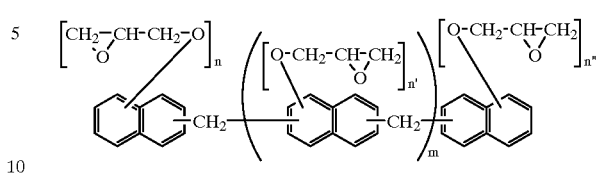

(wherein "m" is 0, 1 or 2; "n", "n'" and "n''" are 1, 2, 3 or 4; and the groups with "n", "n'" and "n''" may be attached independently to either one ring or both rings of each of the naphthalene rings); and Chemical Formula 5

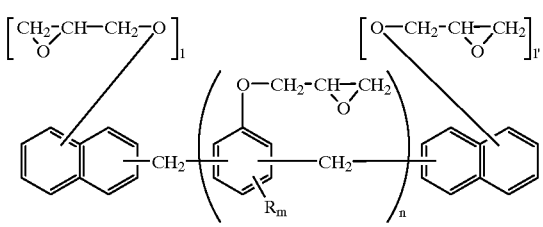

(wherein R is an alkyl group with 1 to 10 carbon atoms: "m" is 0, 1 or 2; "n" is 1, 2 or 3; "l" and "l'" are 1, 2, 3 or 4; and the groups with "n", "l" and "l'" may be attached independently to either one ring or both rings of each of the naphthalene rings); or an epoxy resin with an anthracene backbone;

(b) a bifunctional epoxy resin containing two p-(2,3-epoxypropoxy) phenyl groups;

(c) an acid anhydride curing agent; and (d) a metal acetonate curing catalyst represented by the Chemical formula 2 as follows:

Chemical Formula 2

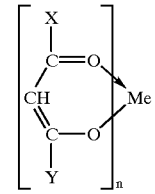

(wherein X and Y represent methyl group or phenyl group; Me represents Mn, Co, Zn or Zr; and "n" represents the coordination number) at 0.1 to 5 parts by weight per 100 parts by weight of the epoxy resins;

wherein the ratio of the number of the epoxy resins used is 1 to 4, the ratio being represented by the following relationship:

Ratio of number of epoxy resins={(molar number of (b) used)×(number of epoxy resins in 1 mole of (b))}÷{(molar number of (a) used)×(number of epoxy resins in 1 mole of (a))}.

14. The rotor according to claim 13, wherein the epoxy resin with an anthracene backbone is selected from the group consisting of diglycidyl ether of anthracene diol and triglycidyl ether of anthracene triol.

15. A method for producing a stator of rotating machine, comprising the steps of: incorporating into an iron core slot an electrically insulated coil produced by winding an insulating tape base material around a stack of insulated conductors formed into a defined coil shape together with a semi-electrically conductive slot liner, inserting a wedge into an external circumferentially groove of the iron core slot to connect the electrical insulating coil to an external end part of the iron core, and thereafter impregnating and curing the electrically insulated coil and the iron core slot in their integrated state with a thermosetting resin composition;

wherein as the insulating tape base material use is made of an insulating tape base material with a heat conductivity as high as 0.3 to 0.8 W/mK;

wherein as the semi-electrically conductive slot liner, use is made of a highly heat-conductive, semi electrical conductive slot liner with a heat conductivity as high as 0.3 to 1.0 W/mK and surface resistance of 0.2 to 100 kΩ; and wherein as the thermosetting resin composition, use is made of a thermosetting resin composition being at a viscosity of 5 poise or more at 25° C. and a viscosity of 5 poise or less at 60° C. and comprising:

(a) a polyfunctional epoxy resin containing three or more p-(2,3-epoxypropoxy) phenyl groups and a group represented by the Chemical formula 1 as follows:

Chemical Formula 1
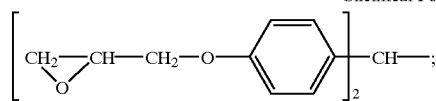

or an epoxy resin with a naphthalene backbone, represented by the Chemical formula 3, 4 or 5 as follows:

Chemical Formula 3
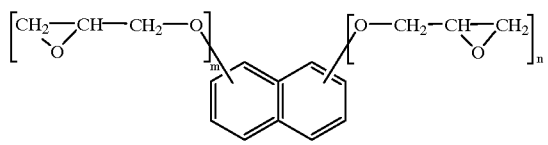

(wherein "n" and "m" are 1, 2 or 3);

Chemical Formula 4
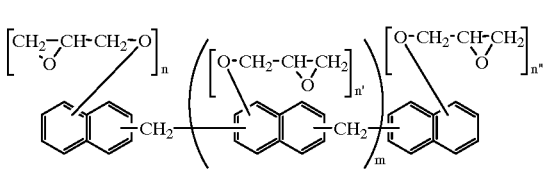

(wherein "m" is 0, 1 or 2; "n", "n'" and "n''" are 1, 2, 3 or 4; and the groups with "n", "n'" and "n''" may be attached independently to either one ring or both rings of each of the naphthalene rings); and Chemical Formula 5
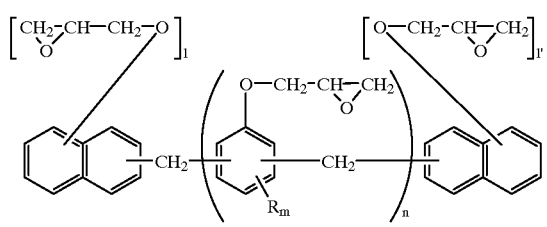

(wherein R is an alkyl group with 1 to 10 carbon atoms; "m" is 0, 1 or 2; "n" is 1, 2 or 3; "l" and "l'" are 1, 2, 3 or 4; and the groups with "n", "l" and "l'" may be attached independently to either one ring or both rings of each of the naphthalene rings), or an epoxy resin with an anthracene backbone;

(b) a bifunctional epoxy resin containing two p-(2,3-epoxypropoxy) phenyl groups;

(c) an acid anhydride curing agent; and (d) a metal acetonate curing catalyst represented by the Chemical formula 2 as follows:

Chemical Formula 2
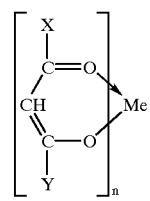

(wherein X and Y represent methyl group or phenyl group; Me represents Mn, Co, Zn or Zr; and "n" represents the coordination number) at 0.1 to 5 parts by weight per 100 parts by weight of the epoxy resins;

wherein the ratio of the number of the epoxy resins used is 1 to 4, the ratio being represented by the following relationship:

Ratio of number of epoxy resins={(molar number of (b) used)×(number of epoxy resins in 1 mole of (b))}÷{(molar number of (a) used)×(number of epoxy resins in 1 mole of (a))}.

16. The method according to claim 13, wherein the epoxy resin with an anthracene backbone is selected from the group consisting of diglycidyl ether of anthracene diol and triglycidyl ether of anthracene triol.

* * * * *